United States Patent
Matsubara et al.

(10) Patent No.: US 6,773,372 B2
(45) Date of Patent: Aug. 10, 2004

(54) VEHICLE DRIVE CONTROL APPARATUS AND METHOD

(75) Inventors: Tooru Matsubara, Toyota (JP); Hideo Tomomatsu, Nagoya (JP); Yoshikazu Tanaka, Toyota (JP); Ayato Noumori, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/414,478

(22) Filed: Apr. 16, 2003

(65) Prior Publication Data

US 2003/0203790 A1 Oct. 30, 2003

(30) Foreign Application Priority Data

Apr. 25, 2002 (JP) ........................................ 2002-124952

(51) Int. Cl.$^7$ .............................................. B60K 41/02
(52) U.S. Cl. ........................................................ 477/78
(58) Field of Search ................................... 477/78, 107

(56) References Cited

U.S. PATENT DOCUMENTS 5,231,897 A * 8/1993 Morita ........................ 477/120

FOREIGN PATENT DOCUMENTS

| JP | 1-193436 A | 8/1989 |
| JP | 6-346957 A | 12/1994 |
| JP | 8-170488 A | 7/1996 |
| JP | 9-53718 A | 2/1997 |
| JP | 2002-364725 A | 12/2002 |

* cited by examiner

Primary Examiner—Dirk Wright
(74) Attorney, Agent, or Firm—Kenyon & Kenyon

(57) ABSTRACT

A vehicle drive control apparatus includes an engine that generates power through combustion of fuel, an automatic transmission that transmits a reverse input from a driving wheel to the engine and automatically performs a gear shifting among a plurality of forward gear stages each having a different gear ratio, a fluid power transmission device interposed between the automatic transmission and the engine for transmitting power through fluid, the fluid power transmission device having a lock-up clutch, and a controller. The controller executes a fuel cut control for stopping supply of the fuel to the engine upon establishment of a fuel cut condition including that a vehicle is in a coasting state where a throttle valve of the engine is fully closed, and an engine speed is equal to or higher than a predetermined value, executes a control for engaging the lock-up clutch upon establishment of a lock-up clutch engagement condition including that the vehicle is in the coasting state, and executes a control of the automatic transmission for downshifting at a coast down vehicle speed that changes in accordance with a state of the lock-up clutch under the control for engaging the lock-up clutch.

20 Claims, 18 Drawing Sheets

FIG. 2

|     | C1 | C2 | C3 | C4  | B1  | B2  | B3 | B4  | F0  | F1 | F2 | F3 |
|-----|----|----|----|-----|-----|-----|----|-----|-----|----|----|----|
| Rev |    |    | ○  |     | (○) |     |    | ○   |     | ○  |    |    |
| N   |    |    |    |     |     |     |    |     |     |    |    |    |
| 1st | ○  |    |    | (○) |     |     |    | (○) | ○   |    |    | ○  |
| 2nd | ○  |    |    | (○) |     | (○) | ○  |     | ○   | ○  | ○  |    |
| 3rd | ○  |    | ○  | (○) | (○) |     | ●  |     | ○   | ○  |    |    |
| 4th | ○  | ○  | ●  | (○) |     |     | ●  |     | ○   |    |    |    |
| 5th | ●  | ○  | ○  |     | ○   |     | ●  |     |     |    |    |    |
| 6th | ●  | ○  |    |     | ●   | ○   | ●  |     |     |    |    |    |

| RANGE | GEAR STAGE |
|---|---|
| D | 1, 2, 3, ④, ⑤, ⑥ |
| 5 | 1, 2, 3, ④, ⑤ |
| 4 | 1, 2, 3, ④ |
| 3 | 1, 2, ③ |
| 2 | 1, ② |
| L | ① |

UP ↑ ↓ DOWN

F I G. 19
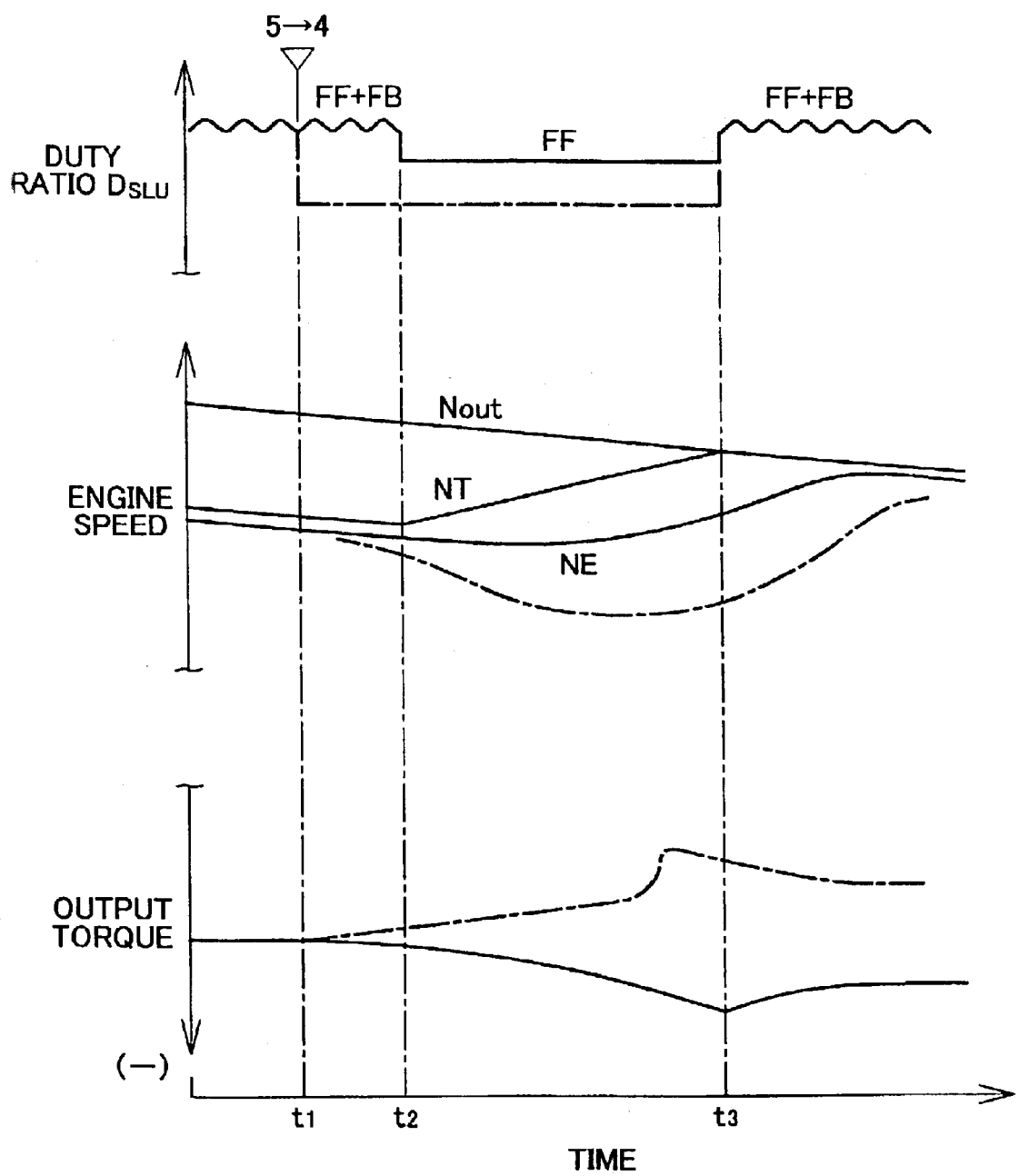

VEHICLE DRIVE CONTROL APPARATUS AND METHOD

INCORPORATION BY REFERENCE

The disclosure of Japanese Patent Application No. 2002-124952 filed on Apr. 25, 2002, including the specification, drawings and abstract are incorporated herein by reference in its entirety.

BACKGROUND OF THE INVENTION

1. Field of Invention

The invention relates to a vehicle drive control apparatus and, more particularly, to a vehicle drive control executed in a coast state of the vehicle where a throttle valve is fully closed.

2. Description of Related Art

There is a known vehicle drive control apparatus including (a) an engine that generates power through combustion of fuel, (b) a fluid power transmission device having a lock-up clutch for transmitting the power through fluid, (c) a unit for executing a fuel cut control that stops supply of the fuel upon establishment of a fuel cut condition including that a vehicle is in a coast state where a throttle valve of the engine is fully closed, and an engine speed is equal to or higher than an engine speed at release of the fuel cut operation (hereinafter referred to as F/C release engine speed), and (d) a unit for engaging the lock-up clutch upon establishment of a lock-up clutch engagement condition including that the vehicle is in the coast state. For example, in an apparatus disclosed in JP-A-9-53718, the lock-up clutch is slip engaged in the coast state such that the engine speed is increased and the fuel cut range (vehicle speed range) is expanded, thus improving the fuel efficiency.

In the above-described vehicle drive control apparatus, a reverse input of the driving wheels causes the engine speed to be increased, generating the engine braking force. Upon downshifting in the automatic transmission as decrease in the vehicle speed, an inertia caused by the change in the engine speed considerably varies the engine braking force, which may cause the occupant of the vehicle to feel a certain shock. If the vehicle speed in the coast state at downshifting is reduced as low as possible, the range of the change in the engine speed can be decreased, thus reducing the shock. In the aforementioned case, however, the engine speed may become lower than the F/C release engine speed at rapid deceleration of the vehicle such that the fuel supply is resumed, thus deteriorating the fuel efficiency. As the coast down vehicle speed is set to be relatively higher in order to continue the fuel cut operation (interruption of the fuel supply), the shock resulting from shifting is likely to occur. Reducing the shock by decreasing the shifting speed, however, may lower the engine speed below the F/C release engine speed during shifting.

In the case where the lock-up clutch is not slip controlled for a certain reason (for example, the temperature of the work fluid is low), the engine speed is decreased and thus the fuel cut is not operated. When downshifting is performed at the same speed as that of the aforementioned state, the rotational speed of the input shaft considerably changes to cause the shock owing to the change in the engine speed even if the lock-up clutch is in an OFF state.

In the case where the idling speed of the engine is increased to be higher upon actuation of an accessory such as an air conditioning unit, assuming that the F/C release engine speed is set to a constant value, the engine speed changes at release of the fuel cut operation, resulting in the shock. If the F/C release engine speed is increased to cope with the change in the idling speed, the engine speed may become lower than the F/C release engine speed such that the fuel supply is resumed, deteriorating the fuel efficiency.

Generally the slip control of the lock-up clutch is executed through a feedback control such that the slip amount of the lock-up clutch approaches a predetermined target slip amount. The feedback control is stopped at downshifting operation where the engine speed changes sharply because of low response. The slip control is executed through a feed-forward control (at a constant engagement torque) only. If the engagement torque of the lock-up clutch is set to a lower value, the engine speed is decreased to be lower than the F/C release engine speed. As a result, the fuel supply is resumed, deteriorating the fuel efficiency. On the contrary, if the engagement torque is set to a higher value, the engine braking force changes sharply, the shock is likely to occur. If the feedback control is resumed after completion of shifting in the state there the deviation between the actual and the target slip amounts is large, the slip amount, that is, the engine speed may be changed in accordance with the deviation. The sharp change in the engine braking force, thus, may cause the vehicle occupant to feel the shock.

SUMMARY OF THE INVENTION

It is an object of the invention to provide a technology that prevents generation of a shock owing to the sharp change in the engine braking force at downshifting, or deterioration in the fuel efficiency owing to resumption of the fuel supply caused by the engine speed lower than the F/C release engine speed in a coast state where the fuel cut control and the lock-up clutch engagement control are executed.

According to an embodiment of the invention, a vehicle drive control apparatus includes an engine that generates power through combustion of fuel, an automatic transmission that transmits a reverse input from a driving wheel to the engine and automatically performs a gear shifting among a plurality of forward gear stages each having a different gear ratio, a fluid power transmission device interposed between the automatic transmission and the engine for transmitting power through fluid, the fluid power transmission device having a lock-up clutch, and a controller. The controller executes a fuel cut control for stopping supply of the fuel to the engine upon establishment of a fuel cut condition including that a vehicle is in a coasting state where a throttle valve of the engine is fully closed, and an engine speed is equal to or higher than a predetermined value, executes a control for engaging the lock-up clutch upon establishment of a lock-up clutch engagement condition including that the vehicle is in the coasting state, and executes a control of the automatic transmission for downshifting at a coast down vehicle speed that changes in accordance with a state of the lock-up clutch under the control for engaging the lock-up clutch.

In the aforementioned embodiment, the controller sets the coast down vehicle speed at which the lock-up clutch is engaged to be higher than the coast down vehicle speed at which the lock-up clutch is disengaged.

In the vehicle drive control apparatus, the downshifting is performed by the automatic transmission at a coast down vehicle speed that is set depending on the engagement state of the lock-up clutch. If the coast down vehicle speed at which the lock-up clutch is engaged is set to the value higher than the coast down vehicle speed at which the lock-up clutch is disengaged, downshifting can be performed while continuing the fuel cut operation in the state where the lock-up clutch is engaged. This makes it possible to improve the fuel efficiency. Meanwhile, if there is a high possibility that the fuel cut operation is not executed because of decrease in the engine speed when the lock-up clutch is disengaged, the downshifting is performed at a low vehicle speed. Therefore, the change in the rotational speed of the related portions along with the downshifting performance may be reduced, thus preventing the downshifting shock.

In the embodiment, the controller sets the coast down vehicle speed at which the lock-up clutch is disengaged is higher than the coast down vehicle speed at which the lock-up clutch is engaged.

If the coast down vehicle speed at which the lock-up clutch is disengaged is set to the value higher than the coast down vehicle speed at which the lock-up clutch is engaged, downshifting can be performed while continuing the fuel cut operation in the state where the lock-up clutch is engaged. Even in the state where the lock-up clutch is disengaged, if the coast down vehicle speed is set to be relatively higher such that the engine is caused to be operated accompanied with the fluid power transmission device to continue the fuel cut operation, downshifting can be performed while continuing the fuel cut operation, thus further improving the fuel efficiency.

According to an embodiment of the invention, a vehicle drive control apparatus includes an engine that generates power through combustion of fuel, an automatic transmission that transmits a reverse input from a driving wheel to the engine and automatically performs a gear shifting among a plurality of forward gear stages each having a different gear ratio, and a controller. The controller executes a fuel cut control for stopping supply of the fuel to the engine upon establishment of a fuel cut condition including that a vehicle is in a coasting state where a throttle valve of the engine is fully closed, and an engine speed is equal to or higher than a predetermined fuel cut release engine speed, and changes a coast down vehicle speed and upshifting vehicle speed in accordance with a change in the fuel cut release engine speed so as to continue the fuel cut control irrespective of the change in the fuel cut release engine speed.

In the case where the idling speed is changed in accordance with ON/OFF operation of accessories, for example, an air conditioning device such that the F/C release engine speed is changed, the coast down vehicle speed and the upshifting vehicle speed are changed in accordance with the change in the F/C release engine speed such that the fuel cut operation is continued irrespective of the change in the F/C release engine speed. The fuel cut operation, thus, can be continued as well as improve the fuel efficiency. As the coast down vehicle speed is changed in accordance with the change in the F/C release engine speed, it can be set to be as low as possible. The resultant change in the engine speed accompanied with the downshifting and further the change in the engine braking force may be decreased to reduce the resultant shock.

According to an embodiment of the invention, a vehicle drive control apparatus includes an engine that generates power through combustion of fuel, an automatic transmission that transmits a reverse input from a driving wheel to the engine and automatically performs a gear shifting among a plurality of forward gear stages each having a different gear ratio, and a controller. The controller executes a fuel cut control for stopping supply of the fuel to the engine upon establishment of a fuel cut condition including that a vehicle is in a coasting state where a throttle valve of the engine is fully closed, and an engine speed is equal to or higher than a predetermined value, executes a control of the automatic transmission for downshifting at a predetermined coast down vehicle speed so as to continue the fuel cut control in the coasting state, and executes a control of changing a downshifting speed such that the downshifting speed increases as an increase in a deceleration of the vehicle.

In the embodiment, the downshifting speed is increased as the increase in the deceleration of the vehicle. If the deceleration is relatively high, the downshifting operation can be smoothly performed. As a result, the time period from the time at which the engine speed reaches the F/C release engine speed to the time at which the fuel supply is released may be elongated so as to improve the fuel efficiency. If the deceleration is relatively low, the downshifting speed is at a relatively lower. As a result, each change in the engine speed or the engine braking, may be gentle, thus preventing generation of the resultant shift shock.

When the deceleration is relatively higher, it is normally determined that the braking operation is performed. Therefore, there is a low possibility of causing the vehicle occupant to feel the shift shock even if the shifting speed increase. If the coast down vehicle speed is made higher in case of the large deceleration of the vehicle, the time period taken until resumption of the fuel supply may be elongated by lowering the engine speed at downshifting. This may reduce the hysteresis relative to the upshifting, which has a possibility of causing the vehicle operator to feel frequent shifting at operation of the accelerator pedal, which may be disadvantageous According to an embodiment of the invention, a vehicle drive control apparatus includes an engine that generates power through combustion of fuel, an automatic transmission that transmits a reverse input from a driving wheel to the engine and automatically performs a gear shifting among a plurality of forward gear stages each having a different gear ratio, a fluid power transmission device interposed between the automatic transmission and the engine for transmitting power through fluid, the fluid power transmission device having a lock-up clutch, and a controller. The controller executes a fuel cut control for stopping supply of the fuel to the engine upon establishment of a fuel cut condition including that a vehicle is in a coasting state where a throttle valve of the engine is fully closed, and an engine speed is equal to or higher than a predetermined value, executes a control for engaging the lock-up clutch upon establishment of a lock-up clutch engagement condition including that the vehicle is in the coasting state, executes a control of the automatic transmission for downshifting at a predetermined coast down vehicle speed so as to continue the fuel cut control in the coasting state, and executes a feedback control of an engagement torque of the lock-up clutch such that a slip amount of the lock-up clutch reaches a target slip amount upon execution of the control of the automatic transmission for downshifting.

In the embodiment, the engagement torque of the lock-up clutch is feedback controlled such that the slip amount of the lock-up clutch reaches a target slip amount at downshifting. As the slip amount can be controlled so as not to be excessive, the engine speed does not decrease to be lower than the F/C release engine speed. Accordingly, the fuel supply is not resumed, preventing deterioration in the fuel efficiency. This makes it possible to prevent a large decrease in the engine speed owing to the excessive slip amount. Therefore the coast down vehicle speed can be set to the value as low as possible so as to reduce the shock resulting from shifting by decreasing the change in the engine speed and further the change in the engine braking force.

In the embodiment, the controller continues the feedback control of the engagement torque of the lock-up clutch at least until a timing when a rotational speed of an input shaft of the automatic transmission starts changing upon the downshifting and stops thereafter.

According to the embodiment, the deviation between the actual and the target slip amounts does not expand until the timing when the rotational speed of the input shaft of the automatic transmission starts changing at downshifting, that is, the start of the inertia phase. This makes it possible to execute the feedback control until when the deviation between the actual and the target slip amounts is expanded by the change in the rotational speed of the input shaft, and to stop the feedback control so as to restrain the decrease in such rotational speed of the input shaft. This may restrain the shock resulting from shifting owing to sharp change in the engine speed, and further the engine braking force.

In an embodiment, a vehicle drive control apparatus includes an engine that generates power through combustion of fuel, an automatic transmission that transmits a reverse input from a driving wheel to the engine and automatically performs a gear shifting among a plurality of forward gear stages each having a different gear ratio, a fluid power transmission device interposed between the automatic transmission and the engine for transmitting power through fluid, the fluid power transmission device having a lock-up clutch, and a controller. The controller executes a fuel cut control for stopping supply of the fuel to the engine upon establishment of a fuel cut condition including that a vehicle is in a coasting state where a throttle valve of the engine is fully closed, and an engine speed is equal to or higher than a predetermined value, executes a feedback control of an engagement torque of the lock-up clutch such that a slip amount of the lock-up clutch reaches a target slip amount upon establishment of a lock-up engagement condition including that the vehicle is in the coasting state, and executes a control of the automatic transmission for downshifting at a predetermined coast down vehicle speed so as to continue the fuel cut control in the coasting state. The feedback control of the engagement torque of the lock-up clutch is temporarily stopped upon downshifting, and a performance ability of the feedback control of the slip amount is temporarily lowered upon resumption of the feedback control of the engagement torque of the lock-up clutch after the downshifting.

According to the embodiment, the feedback control is temporarily stopped upon downshifting. This makes it possible to prevent expansion of the deviation between the actual and the target slip amounts accompanied with the change in the rotational speed of the input shaft of the automatic transmission in the downshifting. Therefore, this may restrain the shift shock owing to sharp change in the engine speed, and further the engine braking force. Upon resumption of the feedback control after the downshifting, the performance ability of the feedback control of the slip amount is temporarily lowered. As a result, sharp change in the engine speed and further the engine braking force caused by the deviation in the slip amount may be avoided at resumption of the feedback control, thus restraining the shift shock.

In the embodiment, the controller temporarily increases the target slip amount to a temporal target slip amount in accordance with an actual slip amount upon resumption of the feedback control after the downshifting, and gradually returns the temporal target slip amount to the target slip amount that has been previously set.

According to the embodiment, the target slip amount is temporarily increased in accordance with the actual slip amount, and then, the increased target slip amount is gradually returned to the previously set target value upon resumption of the feedback control in the downshifting. This makes it possible to return the slip amount that has been increased as the change in the rotational speed of the input shaft upon downshifting to the previously set target slip amount. As the engine speed and the engine braking force are gradually changed accordingly, the shift shock may further be restrained.

In an embodiment of the invention, a vehicle drive control apparatus includes an engine that generates power through combustion of fuel, an automatic transmission that transmits a reverse input from a driving wheel to the engine and automatically performs a gear shifting among a plurality of forward gear stages each having a different gear ratio, and a controller. The controller executes a fuel cut control for stopping supply of the fuel to the engine upon establishment of a fuel cut condition including that a vehicle is in a coasting state where a throttle valve of the engine is fully closed, and an engine speed is equal to or higher than a predetermined value, executes a control of the automatic transmission for downshifting at a predetermined coast down vehicle speed so as to continue the fuel cut control in the coasting state, and temporarily expands an air passage in an intake side of the engine while continuing execution of the fuel cut control during the downshifting.

According to the embodiment, the air passage of the intake side of the engine is temporarily expanded while continuing the fuel cut operation in the downshifting. The engine braking force is decreased by the pumping, effect, and the shift shock may be restrained by preventing sharp increase in the engine braking force caused by the change in the engine speed in the downshifting.

BRIEF DESCRIPTION OF THE DRAWINGS

FIG. 2 is a table representing a relationship between a plurality of hydraulic friction engagement devices and the gear stages established thereby;

FIG. 19 is a time chart representing each change in the engine speed caused by the slip control in accordance with the flowchart of FIG. 18 at downshifting in the coast state;

DETAILED DESCRIPTION OF PREFERRED EMBODIMENTS

Figure 1:
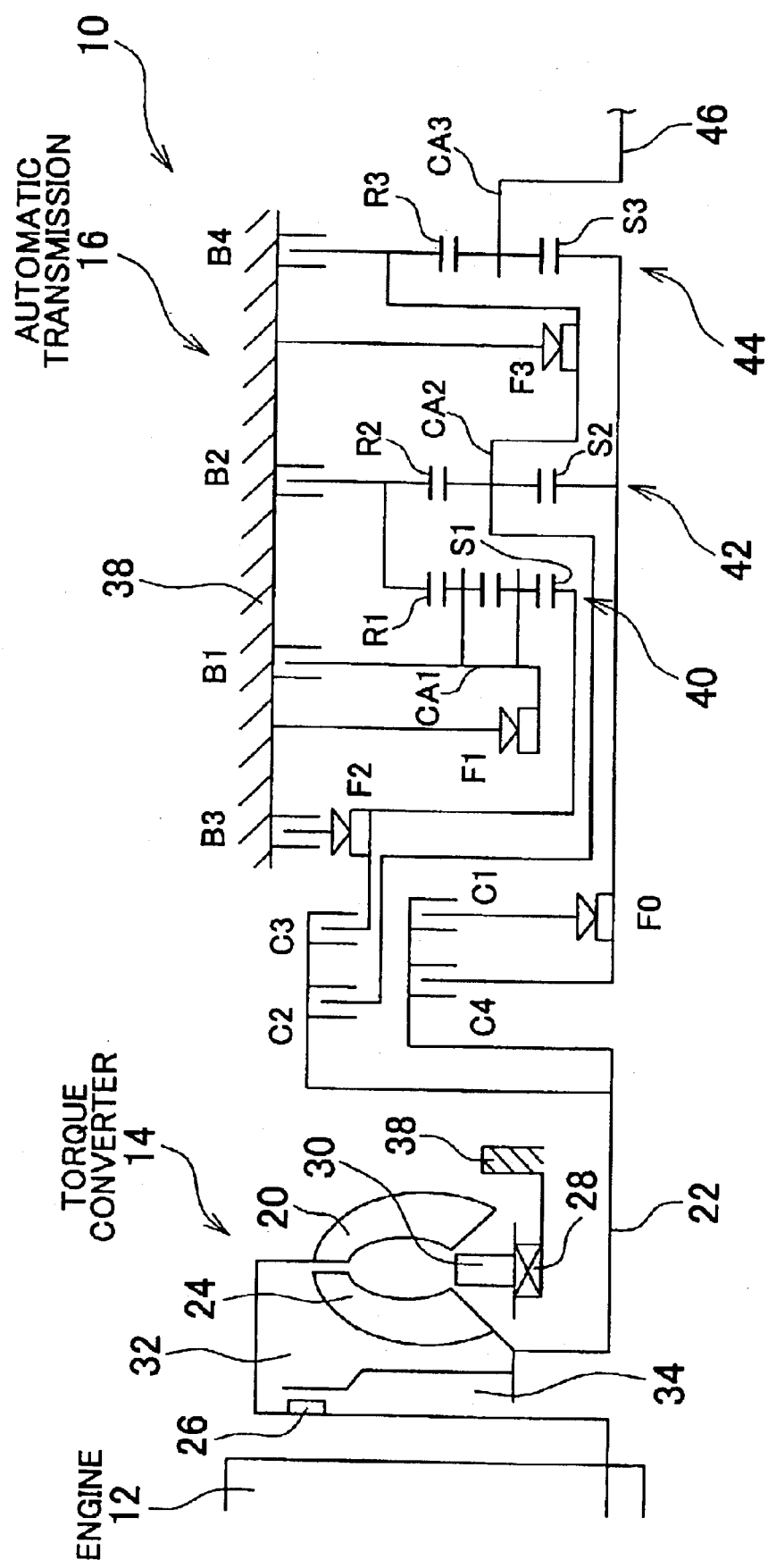
FIG. 1 is a schematic view of a vehicle drive control apparatus to which the invention has been applied.

A vehicle drive control apparatus according to the invention includes an engine as a driving power source for the vehicle. However, it may be applied to a hybrid vehicle drive control apparatus including other type of the driving power source such as an electric motor in addition to the engine.

The engine includes a fuel injection device capable of controlling a fuel cut operation that automatically stops supply of the fuel. It is preferable to use an electronic throttle valve that can be electrically operated as a throttle valve for adjusting the intake air quantity. However, the throttle valve that is mechanically operated upon operation of an accelerator pedal (output demand) by a vehicle operator may be employed. According to an embodiment of the invention, an air passage may be expanded during shifting at coasting by controlling the electronic throttle valve to be opened. However, an ISC (idling speed control) valve may be operated to expand the air passage.

Various types of automatic transmission may be employed in the embodiment of the invention, for example, a planetary gear type transmission in which a plurality of forward gear stages are established upon engagement/disengagement of a plurality of friction engagement devices, a two-axle type transmission in which a plurality of clutch hub sleeves are moved to establish a plurality of forward gear stages and the like. Other types of automatic transmission such as a CVT may be employed so long as a plurality of forward gear stages can be automatically selected. Although a reverse input from a driving wheel is transmitted to the engine, such reverse input does not have to be always transmitted by all the forward gear stages. The reverse input may be transmitted only by a part of the forward gear stages at a high speed or only in the certain condition, for example, under the sports mode.

The aforementioned automatic transmission is structured to automatically select a plurality of forward gear stages on the basis of a parameter representing an operating state of the vehicle such as a vehicle speed, an opening of the throttle valve and the like. In the coasting state at downshifting where the throttle valve is fully closed, the coast down vehicle speed is set at each of the forward gear stages so as to continue the fuel cut operation. More specifically, it may be set in accordance with an engine speed at release of a fuel/cut (F/C) operation (hereinafter referred to as F/C release engine speed) and a gear ratio of each of the forward gear stages such that downshifting is performed before the engine speed reaches the F/C release engine speed and the engine speed increases.

It is preferable to employ a torque converter with a torque increasing effect as a fluid type power transmission device. However, other type of the fluid type power transmission device such as a fluid coupling may be employed. A lock-up clutch serves to directly connect an input side and an output side of the fluid type power transmission device. It is preferable to employ a hydraulic friction device that is frictionally engaged by a differential pressure of the fluid as the hydraulic power transmission. However, it may be formed as an electromagnetic friction device disposed in parallel with the fluid type power transmission device.

A fuel cut control is executed upon establishment of a fuel cut condition where an engine speed is equal to or higher than a predetermined value. The predetermined value may be set to the F/C release engine speed. When the engine speed becomes lower than the F/C release engine speed, the fuel cut control is stopped. The engine speed other than the F/C release engine speed may be used as the reference value based on which the fuel cut control starts. The F/C release engine speed is defined as the one at which the engine is actuated or autonomously started immediately after resumption of the fuel supply. It may be preliminarily set in consideration with the change in the engine load accompanied with the operation of accessories such as an air conditioning unit. However, it may be shifted to the high speed side as the increase in the engine load. The F/C release engine speed may be changed between two stages upon ON/OFF operation of the air conditioning unit. In the case where the air conditioning unit is of variable displacement type, and the engine load is continuously changed, it may be changed in three or more stages accordingly. In the case where the idling speed is changed in accordance with the engine load, the F/C release engine speed may be changed in accordance with such idling speed. It is preferable that the F/C release engine speed be substantially equal to or higher than the idling speed.

As aforementioned, the engagement torque of the lock-up clutch is feedback controlled such that the slip amount of the lock-up clutch reaches the target slip amount. Alternatively, the lock-up clutch may be engaged completely. In the hydraulic friction clutch that is friction engaged by the differential pressure between the oil chamber close to the engagement side and the oil chamber close to the disengagement side, the duty ratio of a linear solenoid valve for controlling the differential pressure may be feedback controlled as the differential pressure corresponds to the engagement torque.

The downshifting speed is increased as the deceleration of the vehicle increases. If gear shifting is performed by the hydraulic actuator, the hydraulic actuator is rapidly operated by increasing the pressure of the supplied fuel, expanding the cross section area of the oil passage, or increasing back pressure of the accumulator. If gear shifting is performed by the motor driven actuator, the downshifting speed is changed to rapidly actuate the motor driven actuator at a large torque by increasing the motor current. The magnitude of the deceleration may be determined directly on the basis of the change in the vehicle speed. However, it may be determined on the basis of various parameters relating to the deceleration of the vehicle such as the braking operation, braking force, braking oil pressure and the like. The downshifting speed can be controlled to be changed between two stages, that is, high and low, in accordance with presence/absence of the braking operation. However, it may be continuously changed in three or more stages in accordance with the rate of the vehicle speed change (deceleration) or the braking force.

The feedback control of the engagement torque of the lock-up clutch is executed until the rotational speed of the input shaft actually changes in response to the output of shifting (command for changing the hydraulic circuit), that is, start of the inertia phase. The feedback control is then stopped upon start of the inertia phase so as to execute a feed-forward control at a predetermined constant engagement torque. The constant engagement torque, that is, the feed-forward value may be preliminarily set to a predetermined value. However, it is preferable to set the feed-forward value in accordance with parameters relating to the rotational speed of the input shaft or type of shifting performed in the automatic transmission. As a result, it is possible to correct the feed-forward value by learning on the basis of the maximum value of the slip amount in the inertia phase.

Upon resumption of the feedback control after downshifting, the performance ability of the feedback control of the slip amount is temporarily lowered so as to prevent the slip amount, that is, engine speed from hunting with respect to the relatively large deviation. This may be achieved by temporarily increasing the target slip amount, for example. Alternatively the response may be lowered by changing the feedback control gain and the like.

Although the aforementioned control operations may be executed individually, they can be executed in combination at downshifting during coasting.

Embodiment

An embodiment of the invention will be described referring to the drawings. FIG. 1 is a schematic view representing a structure of a vehicle drive apparatus 10 to which the invention has been applied. Referring to FIG. 1, an output of an internal combustion engine 12 as a driving power source is sent to an automatic transmission 16 via a torque converter 14 as a fluid type power transmission 16 so as to be transmitted to drive wheels via an axle. The torque converter 14 includes a pump blade 20 connected to the engine 12, a turbine blade 24 connected to an input shaft 22 of the automatic transmission 16, a stator blade 30 having a rotation in one direction inhibited by a one-way clutch 28, and a lock-up clutch 26 that transmits power through the fluid between the pump blade 20 and the turbine blade 24 so as to be directly connected. The lock-up clutch 26 is of a hydraulic friction clutch that is friction engaged by a differential pressure $\Delta P$ between the oil pressure within an oil chamber 32 close to the engagement side and the oil pressure within an oil chamber 34 close to the disengagement side. The pump blade 20 and the turbine blade 24 rotate together by completely bringing the lock-up clutch 26 into engagement. The differential pressure $\Delta P$, that is, the engagement torque is feedback controlled so as to be engaged in a predetermined slip condition. This may rotate the turbine blade 24 following the pump blade 20 by a predetermined slip amount of 50 rpm, for example. Upon reverse input, the pump blade 20 may be rotated by the predetermined slip amount at −50 rpm following the turbine blade 24

The automatic transmission 16 is of a planetary gear type including a first planetary gear 40 of a double pinion type, and a second planetary gear 42 and a third planetary gear 44 of single pinion type. A sun gear S1 of the first planetary gear 40 is selectively connected to an input shaft 22 via a clutch C3, and selectively connected to a housing 38 via a clutch F2 and a brake B3 such that rotation in a direction opposite to the input shaft 22 is prevented. A carrier CA1 of the first planetary gear 40 is selectively connected to the housing 38 via a brake B1 such that rotation in an opposite direction is always prevented by a one-way clutch F1 disposed in parallel with the brake B1. A ring gear R1 is connected to a ring gear R2 of the second planetary gear 42 so as to be selectively connected to the housing 38 via a brake B2. A sun gear S2 of the second planetary gear 42 is connected to a sun gear S3 of the third planetary gear 44 so as to be selectively connected to the input shaft 22. via a clutch C4, and selectively connected to the input shaft 22 via a one-way clutch F0 and the clutch C1 such that the rotation in the direction opposite to the input shaft 22 is prevented. A carrier CA2 of the second planetary gear 42 is connected to a ring gear R3 of the third planetary gear 44 and selectively connected to the input shaft 22 via the clutch C2 so as to be selectively connected to the housing 38 via a brake B4. The rotation in the opposite direction is always prevented by a one-way clutch F3 disposed in parallel with the brake B4. A carrier CA3 of the third planetary gear 44 is connected to an output shaft 46.

The aforementioned clutches C0 to C4 and the brakes B1 to B4 (hereinafter collectively referred to as a clutch C and a brake B) constitute a hydraulic friction device, for example, multi plate disk clutch and a brake, which is controlled to be engaged by the hydraulic actuator. Solenoid valves Sol1 to Sol5, and linear solenoid valves SL1, SL2 of a hydraulic control circuit 98 (FIG. 3) are applied with electric current and the hydraulic circuit is selected by a manual valve (not shown) such that the engagement/disengagement state is selected to establish 6 forward gear stages (1st to 6th) and 1 reverse gear stage (Rev.) in accordance with an operating position of a shift lever 72 (FIG. 6) as shown in FIG. 2. Referring to FIG. 2, the "1st" to "6th" correspond to the first to sixth forward gear stages, respectively. As the gear stage is selected from the first to the sixth stage, the gear ratio (rotational speed Nin of the input shaft 22/rotational speed Nout of the output shaft 46) is reduced. The gear ratio of the 4th speed is 1.0. Referring to FIG. 2, the circle "○" represents an engagement state, the blank represents a disengagement state, the circle in parenthesis "(○)" represents an engagement state at engine braking, and the filled circle "●" represents an engagement state relating to no power transmission.

Figure 3:
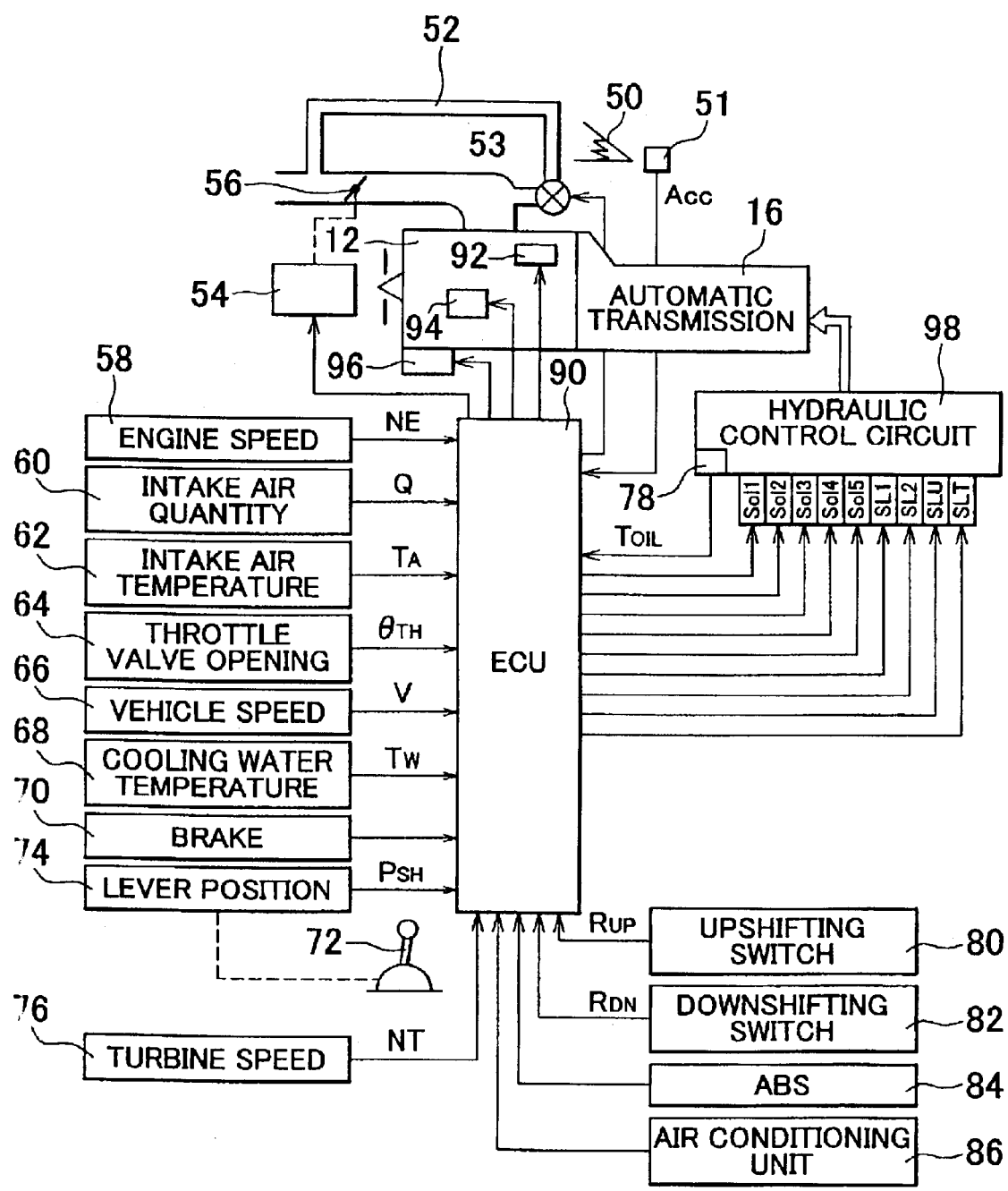
FIG. 3 is a block diagram representing essential portions of a control system of the vehicle drive control apparatus as shown in FIG. 1.

Referring to FIG. 3, the hydraulic control circuit 98 includes a linear solenoid valve SLU for controlling the differential pressure $\Delta P$ of the lock-up oil pressure, that is, the differential oil pressure between the oil chamber 32 close to the engagement side and the oil chamber 34 close to the disengagement side, and a linear solenoid valve SLT for controlling mainly a line oil pressure in addition to the solenoid valves Sol1 to Sol5 for shifting and linear solenoid valves SL1, SL2. The work fluid within the hydraulic control circuit 98 is supplied to the lock-up clutch 14 as well as supplied to various parts such as the automatic transmission 16 for lubrication.

FIG. 3 is a block diagram of a control system provided in the vehicle for controlling the engine 12 and the automatic transmission 16 as shown in FIG. 1. An operation amount Acc of an accelerator pedal 50 is detected by an accelerator operation amount sensor 51. The accelerator pedal 50 is operated by a vehicle operator so as to be depressed in accordance with the required output amount. The accelerator pedal 50 corresponds to an accelerator operating member, and the accelerator pedal operation amount Acc corresponds to the required output amount. An intake pipe of the engine 12 is provided with an electronic throttle valve 56 that is opened at an angle $\theta_{TH}$ in accordance with the accelerator pedal operation amount Acc by a throttle actuator 54. There is an ISC (idling speed control) valve 53 in a bypass passage 52 through which the electronic throttle valve 56 is bypassed for idle speed control such that an idle speed $NE_{IDL}$ of the engine 12 is controlled by controlling intake quantity at the full closing of the electronic throttle valve 56. The intake pipe of the engine 12 is provided with an engine speed sensor 58 for detecting an engine speed NE, an intake air quantity sensor 60 for detecting intake air quantity Q of the engine 12, an intake air temperature sensor 62 for detecting an intake air temperature $T_A$, a throttle sensor 64 with an idle switch for detecting the full closing (idling) state of the electronic throttle valve 56 and the opening degree $\theta_{TH}$, a vehicle speed sensor 66 for detecting the vehicle speed V (corresponding to the rotational speed Nout of the output shaft 46), a cooling water temperature sensor 68 for detecting a cooling water temperature Tw of the engine 12, a brake switch 70 for detecting absence/presence of the operation of the foot brake as being normally used, a lever position sensor 74 for detecting a lever position (operating position) $P_{SH}$ of the shift lever 72, a turbine rotational speed sensor 76 for detecting a turbine rotational speed NT (=rotational speed Nin of the input shaft 22), an AT oil temperature sensor for detecting AT oil temperature $At_{OIL}$ of the work fluid in the hydraulic control circuit 98, an upshift switch 80, a downshift switch 82 and the like. An electronic control unit (ECU) 90 receives inputs of signals indicating the engine speed NE, intake air quantity Q, intake air temperature $T_A$, throttle valve opening $\theta_{TH}$, vehicle speed V, engine cooling water temperature Tw, absence/presence of the braking operation, lever position $P_{SH}$ of the shift lever 72, turbine rotational speed NT, AT oil temperature $T_{OIL}$, upshifting command $R_{UP}$ in the shift range, and downshifting command $R_{DN}$ in the shift range from the aforementioned sensors and switches. The ECU 90 is connected to an ABS (anti-lock brake system) 84 for controlling a braking force so as to prevent the wheels from being locked (slipped) during operation of the foot brake, and receives information relating to the brake oil and the like corresponding to the braking force as well as receives the signal indicating presence/absence of the operation of the air conditioning unit 86.

Figure 4:
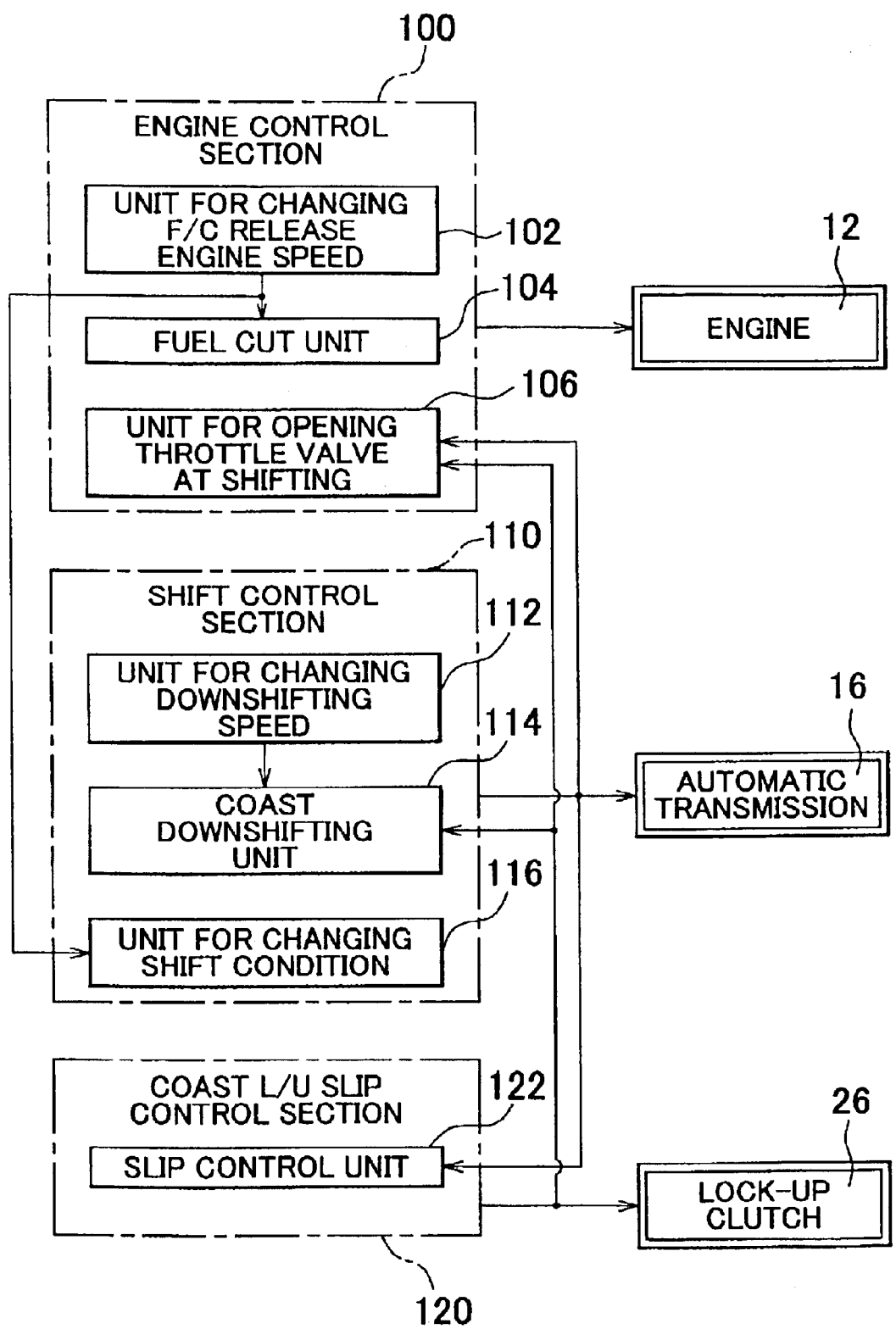
FIG. 4 is a block diagram representing essential portions of an electronic control unit of the vehicle drive control apparatus as shown in FIG. 1.

The ECU 90 is formed of a micro computer including CPU, RAM, ROM, I/O interface and the like. The CPU serves to execute output control of the engine 12, shift control of the automatic transmission 16, and slip control of the lock-up clutch 26 by processing signals in accordance with the program stored in the ROM while using the temporary memory function of the RAM. The CPU may be divided into sections for controlling the engine and shifting in case of necessity. FIG. 4 is a block diagram indicating functions achieved by the ECU 90 that processes the signals.

The block may be divided into three sections, that is, an engine control section 100, a shift control section 110, and a coast L/U slip control section 120.

Figure 5:
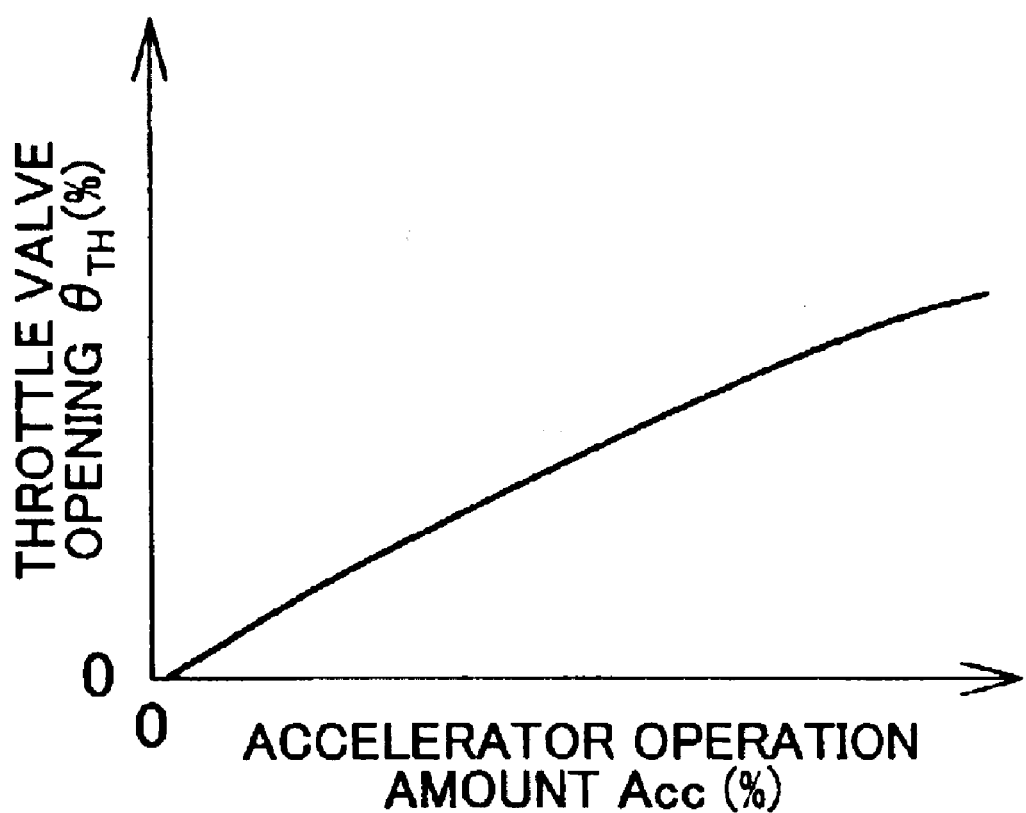
FIG. 5 is a graph showing a relationship between an opening of an electronic throttle valve to be controlled by an engine control section and an accelerator operation amount.

The engine control section 100 basically controls an output of the engine 12. More specifically, the engine control section 100 controls a fuel injection device 92 for adjusting fuel injection quantity, an ignition device 94 such as an igniter for adjusting an ignition timing, an ISC valve 53 for adjusting an idling speed as well as controls an operation of the electronic throttle valve 56 using the throttle actuator 54. The electronic throttle valve 56 is controlled by driving the throttle actuator 54 on the basis of the actual operation amount Acc of the accelerator pedal derived from the graph shown in FIG. 5 such that the opening $\theta_{TH}$ of the throttle valve increases as the increase in the operation amount Acc. The engine 12 is cranked by a starter (electric motor) 96 at start of the engine 12 through control of the electronic throttle valve 56.

Figure 6:
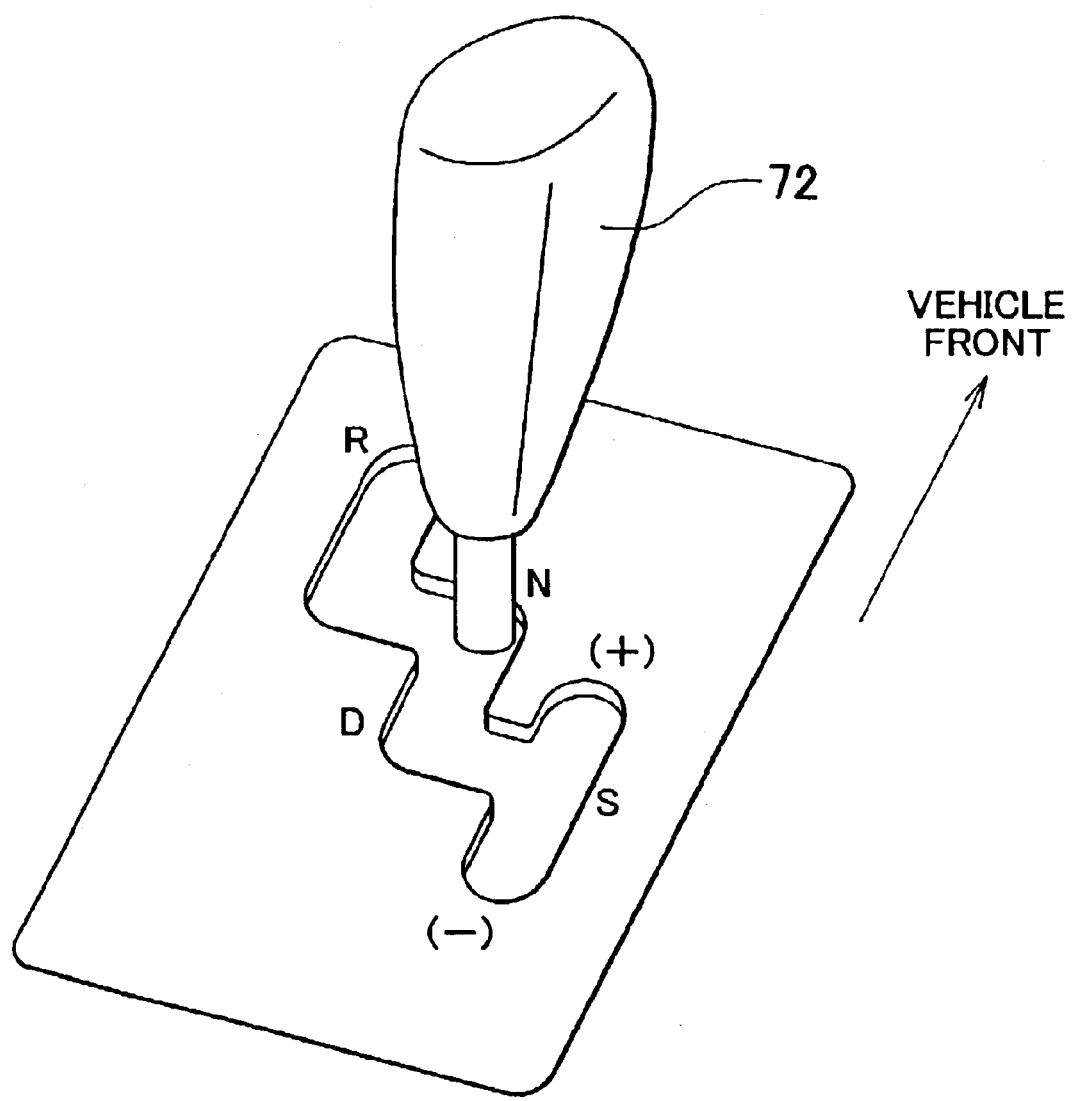
FIG. 6 is a perspective view of a shift lever as shown in FIG. 3.

The shift control section 110 controls shifting of the automatic transmission 16 in accordance with the lever position $P_{SH}$ of the shift lever 72. The shift lever 72 is disposed near a driver's seat and manually selected among 4 positions, "R (reverse)", "N (neutral)", "D (drive)", and "S (sequential)" as shown in FIG. 6. The position "R" represents a reverse running position, the position "N" represents a position at which power transmission is interrupted, the position "D" represents a forward running position through automatic transmission, and the position "S" represents a forward running position which can be manually shifted by selecting a plurality of shifting ranges with different gear stages at high speeds. The lever position sensor 72 serves to detect the currently selected operating position of the shift lever 72. The positions "R", "N", "D(S)" are arranged in the longitudinal direction of the vehicle (the upper portion in FIG. 6 indicates the front of the vehicle). The hydraulic circuit is selected by mechanically operating a manual valve connected to the shift lever 72 via a cable or a link along with its operation in the longitudinal direction. The reverse gear stage "Rev" shown in FIG. 2 is established at the position "R" by mechanically setting the hydraulic circuit to the reverse circuit. All clutches C and brakes B are disengaged by mechanically setting the hydraulic circuit to a neutral circuit at the position "N".

Figures 7, 8:
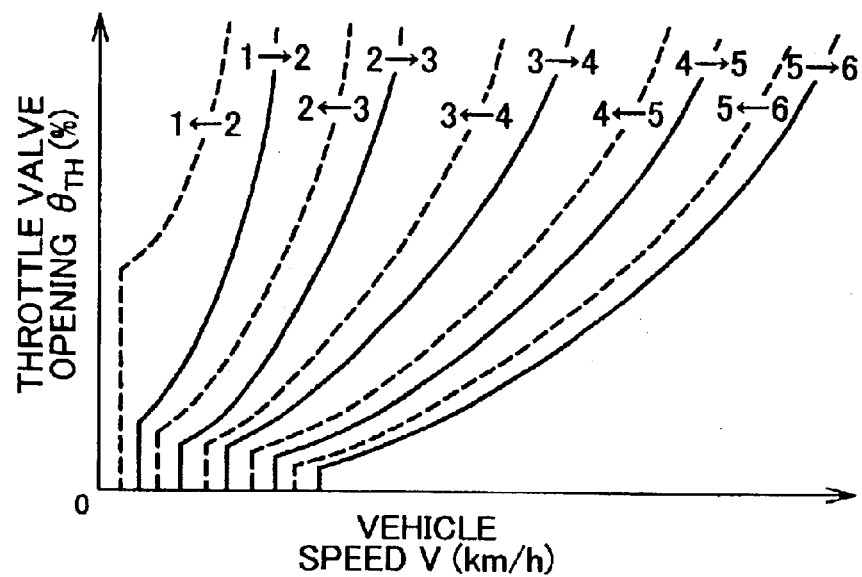
FIG. 7 is an example of a shift map based on which a gear stage of the automatic transmission is automatically selected in accordance with an operation state of the vehicle.
FIG. 8 is a view representing a shift range achieved by operating the shift lever shown in FIG. 6.

In the case where the shift lever 72 is operated to the position "D" or "S", the hydraulic circuit is mechanically set to a forward circuit by the manual valve such that the forward running is allowed while shifting among the forward gear stages from "1st" to "6th" speeds. If the shift lever 72 is set to the position "D", the automatic shifting mode is established on the basis of the signal of the lever position sensor 74 so as to control shifting using all the forward gear stages from the "1st" to "6th" speeds. That is, one of the forward gear stages from the "1st" to "6th" is established through selection of the hydraulic circuit to the corresponding circuit by controlling application of current to the solenoid valves Sol1 to Sol5 and linear solenoid valves SL1, SL2. The aforementioned shifting control is executed in accordance with a shift map (shift conditions) as shown in FIG. 7. In the shift map, the vehicle speed V and the throttle valve opening $\theta_{TH}$ are preliminarily stored as parameters. Referring to the shift map, the low-speed gear stage at high gear ratio is established as the decrease in the vehicle speed V or the increase in the throttle valve opening $\theta_{TH}$. In the present embodiment, the clutch C4 is engaged at the gear stages from the 1st to the 4th speeds, and the braking force is always applied at the gear stages from the 4th to the 6th speeds.

In the case where the shift lever 72 is operated to the position "S", the manual shifting mode is established on the basis of the signal of the lever position sensor 74. As shown in FIG. 6, the position "S" is disposed close to the position "D" in the lateral direction of the vehicle. The hydraulic circuit corresponding to the position "S" is the same as that corresponding to the position "D". However, this position makes it possible to electrically establish the manual shifting mode that allows the driver to select a plurality of shifting ranges within a range shiftable at the position "D", that is, from the 1st to 6th speeds. An upshifting position "(+)" and a downshifting position "(−)" are provided at the position "S" in the longitudinal direction of the vehicle. If the shift lever 72 is operated to the upshifting or the downshifting position, one range is selected among high-speed gear stages that is, different shifting ranges in high-speed side at low gear ratio, that is, "D", "5", "4", "3", "2", and "L" as shown in FIG. 8 on the basis of the upshifting command $R_{UP}$ or downshifting command $R_{DN}$ detected by the upshift switch 80 or the downshift switch 82. Then the shift control is automatically executed within each shifting range in accordance with, for example, the shift map shown in FIG. 7. Referring to FIG. 8, the encircled number indicates the gear stage at the higher-speed in each shifting range to which the engine braking is applied. If the shift lever 72 is repeatedly operated to the downshifting position "−" during running on the downhill, the shifting range is selected from the range "4" to "3", "2", and "L". Accordingly, downshifting is executed from the 4th gear stage to the 3rd, 2nd, and 1st sequentially so as to increase the engine braking force step by step.

The aforementioned upshifting position "+" and downshifting position "−" are not in stable states. The shift lever 72 is automatically returned to the position "S" by an urging member like a spring such that the shifting range is changed depending on the frequency or duration of the operation of the shift lever 72 to the upshifting position or the downshifting position.

The coast L/U slip control section 120 executes a feedback control of the duty ratio $D_{SLU}$ of exciting current applied to the linear solenoid valve SLU which relates to the differential pressure $\Delta P$ such that the lock-up clutch 26 is engaged at a target slip amount SLP (for example, approximately −50 rpm) under the condition where the throttle valve opening $\theta_{TH}$ is substantially zero during running forward in the coast state. The aforementioned slip control is executed at the gear stage where the reverse input from the driving wheel is transmitted to the engine 12, that is, the gear stage by which the engine braking force is applied, for example, any one of the 4th to the 6th speeds. When the lock-up clutch 26 is brought into a slip engagement, the engine speed NE is increased to reach around the turbine rotational speed NT. As a result, the fuel cut range (vehicle speed range) where the fuel supply to the engine 12 is interrupted is expanded, thus improving the fuel efficiency. The coast L/U slip control section 120 constitutes the member that engages the lock-up clutch 26 in the coast state. The lock-up clutch 26 is brought into a complete engagement or the slip engagement at a time other than coasting in a predetermined complete engagement area and slip engagement area respectively in accordance with the parameter such as the throttle valve opening $\theta_{TH}$, vehicle speed V and the like.

The engine control section 100 includes a unit 102 for changing F/C release engine speed, a fuel cut unit 104, and a unit 106 for opening throttle valve at shifting in the coast state. The fuel cut unit 104 executes processing of signals in accordance with a flowchart shown in FIG. 9. The fuel cut unit 104 is designed to improve the fuel efficiency by interrupting the fuel supply to the engine 12 in the coast state under the condition where the throttle valve opening $\theta_{TH}$ is substantially zero. Referring to the flowchart of FIG. 9, it is determined whether the fuel cut (interruption of the fuel supply) is operated in step S1-1. If YES is obtained in step S1-1, that is, the fuel cut control is executed, the process proceeds to step S1-2 where it is further determined whether the condition for stopping the fuel cut operation is established. Meanwhile, if NO is obtained in step S1-1, the process proceeds to step S1-3 where it is determined whether the condition for starting the fuel cut operation is established.

The fuel cut operation is stopped upon establishment of conditions that the engine speed NE is lower than the predetermined F/C release engine speed $NE_{FC}$ ($NE<NE_{FC}$), the accelerator pedal operating amount Acc becomes the value other than substantially zero resulting from depression of the accelerator pedal 50, and the like. If YES is obtained in step S1-2, that is, all the conditions are not met, the process proceeds to step S1-5 where the fuel cut operation is continued. If NO is obtained in step S1-2, that is, any one of the conditions is met, the process proceeds to step S1-4 where the fuel cut operation is stopped such that the fuel supply to the engine 12 is resumed by the fuel injection device 92.

Figure 10:
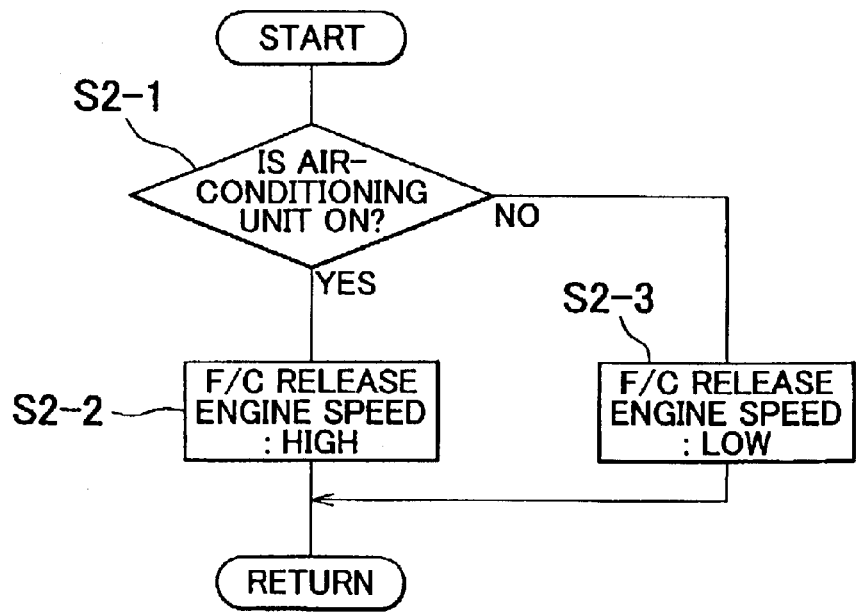
FIG. 10 is a flowchart representing a routine executed by a unit for changing F/C release engine speed as shown in FIG. 4.

The engine speed reaches the F/C release engine speed $NE_{FC}$ when the engine 12 is actuated (autonomously starts) immediately after resumption of the fuel supply. Such engine speed $NE_{FC}$ may be preliminarily set to a constant value in consideration with the change in the engine load resulting from operation of accessories such as the air conditioning device 86. In the present embodiment, however, the $NE_{FC}$ is variable in accordance with the engine load by the unit 102. FIG. 10 shows a flowchart of a routine for processing signals executed by the unit 102 in the engine control section 100. Referring to the flowchart in FIG. 10, in step S2-1, it is determined whether the air conditioning device 86 is turned ON, that is, the air conditioning device 86 is operated. If YES is obtained, that is, the air conditioning device 86 is operated, the process proceeds to step S2-2 where the F/C release engine speed $NE_{FC}$ is increased to a high-speed value. If NO is obtained, that is, the air conditioning device 86 is not operated, the process proceeds to step S2-3 where the F/C release engine speed $NE_{FC}$ is decreased to a low-speed value. This makes it possible to actuate the engine 12 reliably upon resumption of the fuel supply regardless of the high engine load. When the engine load is low, the fuel cut operation is continued so as to improve the fuel efficiency. In the case where the engine load changes continuously resulting from the use of, for example, the air conditioning device 86 of a variable displacement type, the F/C release engine speed $NE_{FC}$ may be changed continuously or stepwise. The idling speed $NE_{idl}$ varies in accordance with the engine load such as ON/OFF operation of the air conditioning device 86. Accordingly, the F/C release engine speed $NE_{FC}$ may be set in accordance with the idling speed $NE_{idl}$ so as to restrain the shock caused by the change in the engine speed NE after start-up of the engine.

Figure 9:
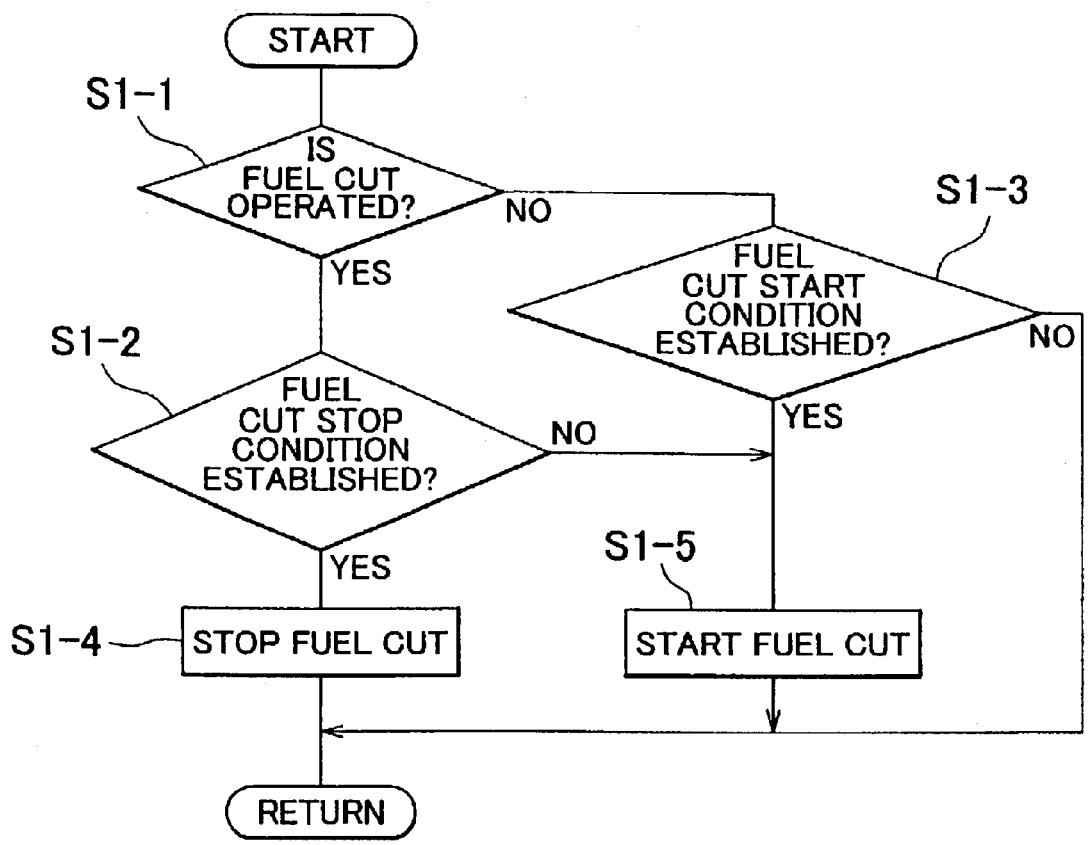
FIG. 9 is a flowchart representing a routine executed by a fuel cut unit as shown in FIG. 4.

Referring to the flowchart of FIG. 9, it is determined that the condition for starting the fuel cut operation is established if the condition for stopping the fuel cut operation is not met as determined in step S1-2. Alternatively, it may be determined that the condition for starting the fuel cut operation is established when other conditions such as the engine speed NE is equal to or higher than a predetermined value by a predetermined amount or rate, and the state where the accelerator pedal is OFF, that is, the accelerator pedal operating amount Acc is substantially zero continues for a predetermined time period or longer are met. The condition that the engine cooling water temperature Tw is equal to or higher than the predetermined temperature may be set as the condition for starting the fuel cut operation. If YES is obtained in S1-3, that is, all the conditions for starting the fuel cut operation are met, the process proceeds to step S1-5 where the fuel cut operation is executed so as to stop the fuel supply by the fuel injection device 92.

Figure 11:
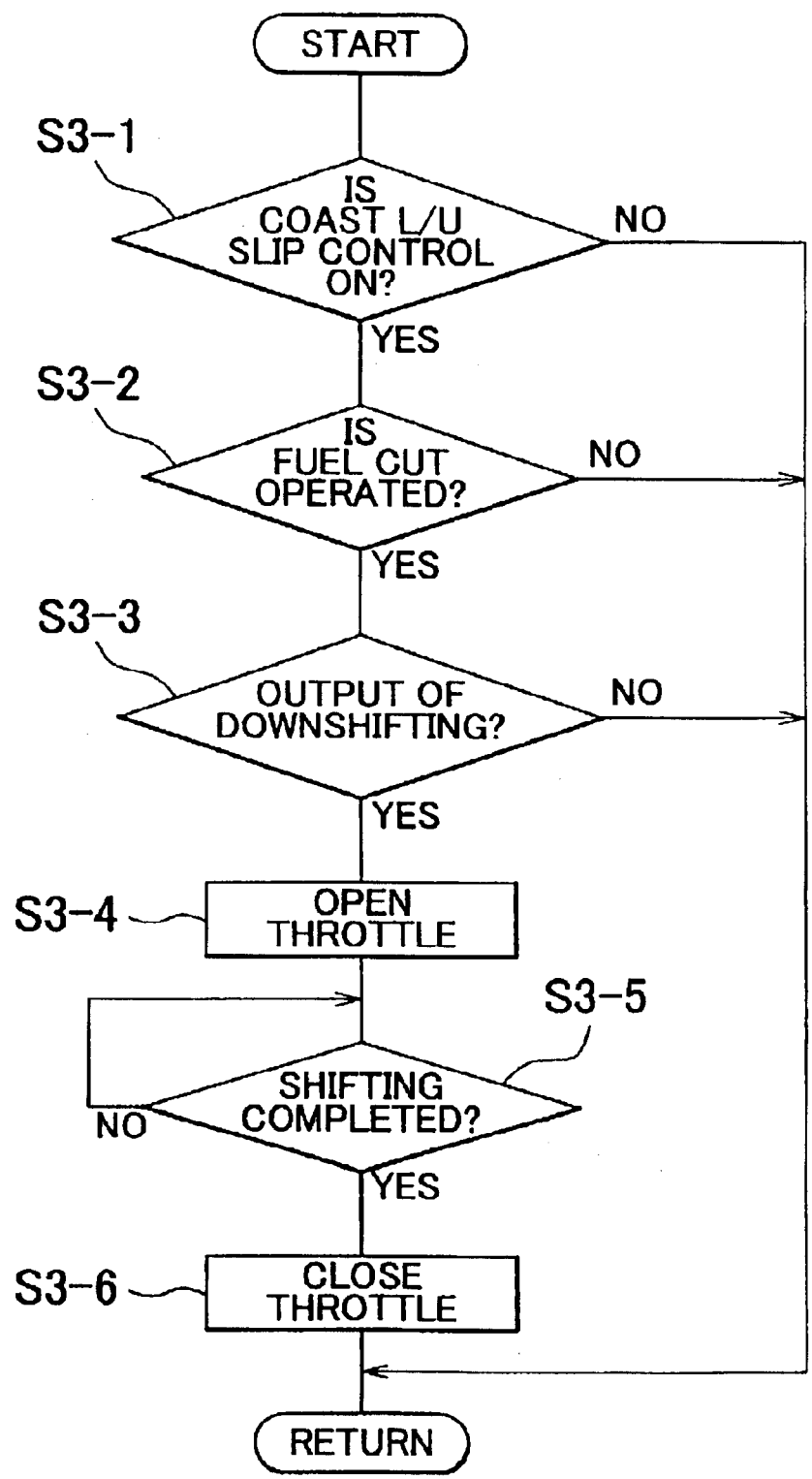
FIG. 11 is a flowchart representing a routine executed by a unit for opening a throttle valve at shifting in the coast state as shown in FIG. 4.

The unit 106 for opening throttle valve at shifting in the coast state as shown in FIG. 4 executes the routine for processing signals in accordance with a flowchart shown in FIG. 11. Referring to the flowchart in FIG. 11, it is determined in step S3-1 whether the slip control of the lock-up clutch 26 is operated by the coast L/U slip control section 120 on the basis of the flag indicating the slip control state. If YES is obtained in step S3-1, that is, the slip control is operated, the process proceeds to step S3-2 where it is determined whether the fuel cut is operated by the fuel cut unit 104. If YES is obtained in step S3-2, that is, the fuel cut is operated, the process proceeds to step S3-3 where it is further determined whether control for changing the current application to the solenoid valves Sol1 to Sol5 and linear solenoid valves SL1, S12, that is, downshifting output has been executed by the shift control section 110. If YES is obtained in step S3-3, that is, the downshifting output is executed, the process proceeds to step S3-4 and the subsequent steps. The downshifting at coasting is executed when the vehicle speed V is decreased to be equal to or lower than a predetermined coast down speed $V_{DN}1$ by a coast downshifting unit 114 as shown in FIG. 4

In step S3-4, the electronic throttle valve 56 of the engine 12 is opened while executing the fuel cut operation so as to restrain the engine braking force caused by the pumping effect. The engine speed NE increases along with the downshifting such that the engine braking force becomes temporarily large by the inertia owing to the change in the engine speed. Therefore the engine braking force is reduced by opening the electronic throttle valve 56 so as to restrain the shock caused by the change in the driving power. The time at which the control of the electronic throttle valve 56 starts may be set to the time when an output of downshifting is generated, or the inertia phase is started. The amount of the opening of the electronic throttle valve 56 may be set to the full opening (100%) and the like. In step S3-5, it is determined whether the downshifting has been completed, that is, whether the ratio of the turbine rotational speed NT to the rotational speed Nout of the output shaft substantially accords with the gear ratio of the gear stage after downshifting. If YES is obtained in step S3-5, that is, the downshifting has been completed, the process proceeds to step S3-6 where the electronic throttle valve 56 is closed. The aforementioned control for closing the electronic throttle valve 56 is executed by gradually changing the throttle valve opening $\theta_{TH}$ so as to gradually increase the engine braking force.

In the case where the downshifting is performed while executing the L/U slip control and the fuel cut operation, the electronic throttle valve 56 is opened while continuing the fuel cut operation such that the air passage at the intake side of the engine 12 is expanded temporarily. As a result, the engine braking force is reduced by the pumping effect to restrain sharp increase in the engine braking force caused by the change in the engine speed at downshifting, thus reducing the shift shock. The unit 106, therefore, serves to expand the air passage at shifting in the coast state.

The shift control section 110 includes a unit 112 for changing downshifting speed, the coast downshifting unit 114, and a unit 116 for changing shift condition. The coast downshifting unit 114 executes a routine for processing signals in accordance with a flowchart shown in FIG. 12. Referring to the flowchart in FIG. 12, in step Q1-1, it is determined whether the throttle valve opening $\theta_{TH}$ is substantially zero and the vehicle is in the coast state, that is, an idling switch of the throttle sensor 64 is turned ON. If YES is obtained in step Q1-1, the process proceeds to step Q1-2 and subsequent steps. In step Q1-2, it is determined whether the slip control of the lock-up clutch 26 is operated by the coast L/U slip control section 120 on the basis of the flag indicating the slip control state. If YES is obtained in step Q1-2, that is, the slip control is in operation, the process proceeds to step Q1-3. In step Q1-3, it is determined whether downshifting is performed. If NO is obtained in Q1-2, that is, the slip control is not in operation, the process proceeds to step Q1-4 where it is determined whether downshifting is performed.

The reference value based on which the downshifting operation is determined, that is, vehicle speed $V_{DN}1$ is set to the value at each gear stage in accordance with the gear ratio of each of the forward gear stages such that the fuel cut operation by the fuel cut unit 104 is continued, in other words, downshifting is performed before the engine speed NE reaches the F/C release engine speed $NE_{FC}$. The vehicle speed $V_{DN}1$ at which the downshifting is performed from 6th to 5th speed is set to the value higher than that of the ordinary downshifting line, i.e., V2, from 6th to 5th speed as shown by a solid line of the graph in FIG. 13. If YES is obtained in Q1-3, that is, $V \leq V_{DN}1$, the process proceeds to step Q1-5 where downshifting is performed such that the engine speed NE is kept higher than the F/C release engine speed $NE_{FC}$, while keeping the fuel cut operation.

Meanwhile, if NO is obtained in step Q1-2, that is, the lock-up clutch 26 is not slip controlled for a certain reason, it is highly assumed that the engine speed NE is reduced compared with that obtained under the slip control. In the aforementioned state, if the vehicle speed V is decreased to the vehicle speed $V_{DN}1$, the engine speed NE becomes lower than the F/C release engine speed $NE_{FC}$, and the fuel cut operation is then stopped. There is a low possibility that downshifting is required at the vehicle speed $V_{DN}1$. The reference value $V_{DN}2$ based on which the downshifting operation is determined in step Q1-4 is set to the value as low as possible regardless of the F/C release engine speed $NE_{FC}$ but in consideration with the shift shock. The vehicle speed $V_{DN}2$ in downshifting from the 6th to 5th speed may be set to be lower than that of the ordinary downshifting line, that is, the vehicle speed V1 from 6th to 5th speed as shown by the solid line of the graph shown in FIG. 13. If YES is obtained in step Q1-4, that is, $V \leq V_{DN}2$ the process proceeds to step Q1-5 where downshifting is performed. In this case, as the vehicle speed V takes a low value, the amount of change in the engine speed NE caused by downshifting is small. Therefore, the shift shock by inertia may be restrained.

Depending on the slip engagement state of the lock-up clutch 26 under the control of the coast L/U slip control section 120, the automatic transmission 16 is operated for downshifting at the vehicle speed selected between $V_{DN}1$ and $V_{DN}2$. When the lock-up clutch 26 is slip controlled, the downshifting is performed at the vehicle speed $V_{DN}1$ that is relatively higher speed such that the fuel cut operation can be continued, thus improving the fuel efficiency. When the lock-up clutch 26 is disengaged, the downshifting is performed at the vehicle speed $V_{DN}2$ that is relatively lower speed such that the amount of change in the rotational speed of the input shaft 22 or the engine 12 is reduced, thus decreasing the shift shock.

Figure 12:
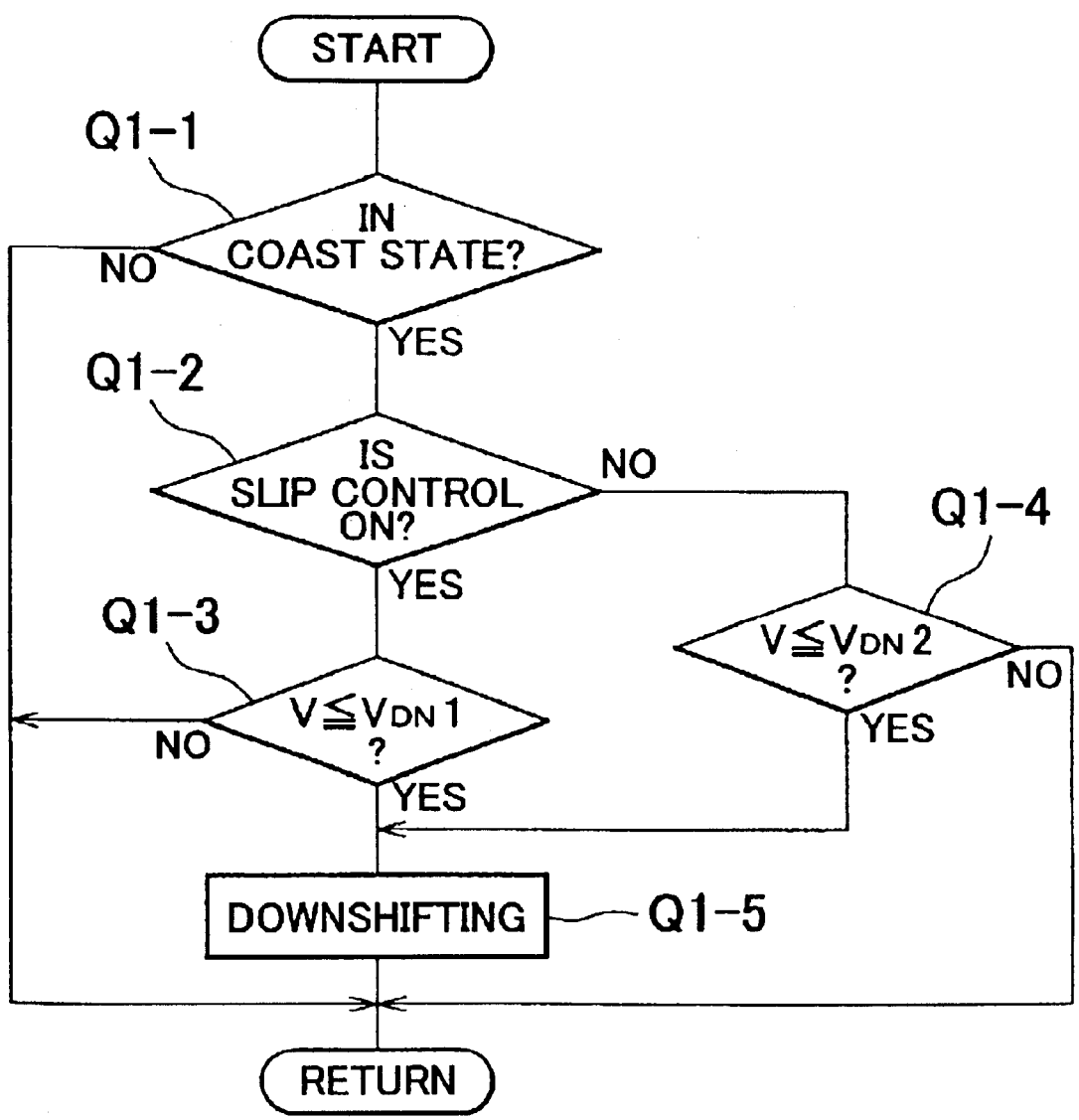
FIG. 12 is a flowchart representing a routine executed by a coast downshifting unit as shown in FIG. 4.

The aforementioned embodiment corresponds to the flowchart of FIG. 12.

Figure 13:
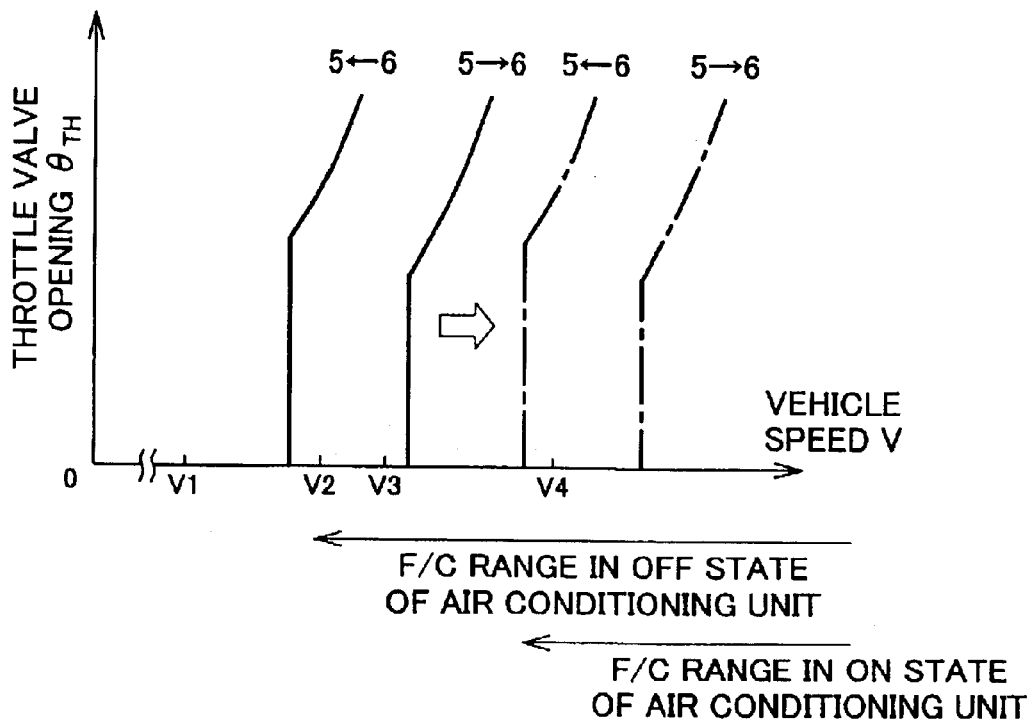
FIG. 13 is a view representing the coast down vehicle speed $V_{DN}1$, $V_{DN}2$ as in the flowchart of FIG. 12.

In step Q1-4, the downshifting determination may be made whether the vehicle speed is equal to or lower than the reference vehicle speed $V_{DN}2$ that is higher than the reference vehicle speed $V_{DN}1$ such as the vehicle speed V3 as shown in FIG. 13. In this case, the fuel cut operation is continued by keeping the relation NE >$NE_{FC}$ even if the lock-up clutch 26 is disengaged. Although the lock-up clutch 26 is disengaged, the pump blade 20 of the torque converter 14 is rotated by the fluid, and the engine speed NE is increased accordingly. The reference vehicle speed $V_{DN}2$ is set such that downshifting is performed in the state where the engine speed NE is higher than the F/C release engine speed $NE_{FC}$.

This makes it possible to improve the fuel efficiency as in the case where the downshifting is performed while continuing the fuel cut operation during slip control of the lock-up clutch 26. However, in the embodiment, downshifting is performed while continuing the fuel cut operation even in case of slip control of the lock-up clutch 26.

The embodiment also corresponds to the flowchart of FIG. 12.

The unit 112 as shown in FIG. 4 changes the downshifting speed by the coast downshifting unit 114 in accordance with deceleration of the vehicle. The unit 112 executes the routine for processing signals in accordance with a flowchart shown in FIG. 14. Referring to the flowchart in FIG. 14, in step Q2-1, it is determined whether the foot brake as being normally used is in ON state, that is, the foot brake is depressed by the driver. If YES is obtained in step Q2-1, that is, the foot brake is operated, in other words, deceleration of the vehicle becomes high, the process proceeds to step Q2-2 where the coast downshifting speed is increased. If NO is obtained in step Q2-1, that is, the foot brake is not operated, the shifting speed is returned to the normal value. The time for shifting is shortened by increasing the engaging hydraulic pressure using the linear solenoid valves SL1, SL2 or increasing the line hydraulic pressure using the linear solenoid valve SLT so as to supply the work fluid to the clutch C or the brake B.

The downshifting speed by the coast downshifting unit 114 is increased when deceleration of the vehicle is high, that is, during braking operation. Therefore, when the deceleration of the vehicle is high, downshifting can be smoothly operated. This may elongate the time elapsing until resumption of the fuel supply as the engine speed NE reaches the F/C release engine speed $NE_{FC}$, thus improving the fuel efficiency. When deceleration of the vehicle is low when the braking is in OFF state, the downshifting speed is low. The shift shock may be restrained because of the gentle change in the engine speed NE or the engine braking force.

Figure 15:
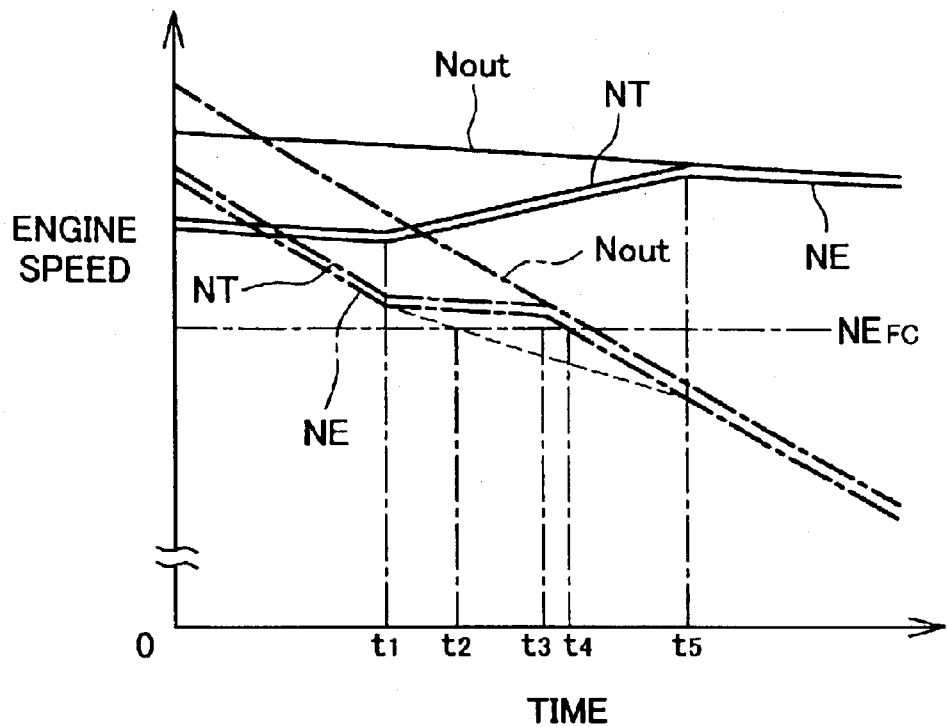
FIG. 15 is a time chart explaining an example of the change in a rotational speed of each portion as the downshifting speed is changed in accordance with the flowchart of FIG. 14 upon ON/OFF operation of the brake.

FIG. 15 is a timing chart representing the change in the engine speed upon selection of the shifting speed in accordance with ON/OFF operation of the brake by the unit 112 for changing downshifting speed upon downshifting from the 5th to 4th speed. The solid line indicates the change in the engine speed in OFF state of the brake, and the chain line indicates the change in the engine speed in ON state of the brake, that is, high deceleration of the vehicle. Referring to the timing chart, the inertia phase starts at the time t1, the shifting is completed at the high speed in ON state of the brake at the time t3, and the shifting is completed at the low speed in OFF state of the brake at the time t5. The shifting time is different by the time from t3 to t5. The dotted line indicates the engine speed NE obtained when downshifting is performed during ON state of the brake at the downshifting speed that is the same as in OFF state of the brake. In the aforementioned case, the engine speed NE becomes lower than the engine speed $NE_{FC}$ at the time t2, and then the fuel cut operation is stopped. In the embodiment of the invention shown by the chain line, the fuel cut operation is continued until the time t4.

There is a low possibility that the braking operation makes the occupant of the vehicle uncomfortable even if the shift shock is caused by the increase in the shifting speed. If the deceleration is high, the time elapsing until resumption of the fuel supply may be elongated by increasing the vehicle speed $V_{DN}1$ such that the decrease in the engine speed NE is retarded through downshifting. As this may reduce the hysteresis with respect to the upshifting, it is likely to cause the driver to feel frequent shifting during operation of the accelerator pedal. This case, therefore, is disadvantageous compared with the embodiment of the invention.

Figure 14:
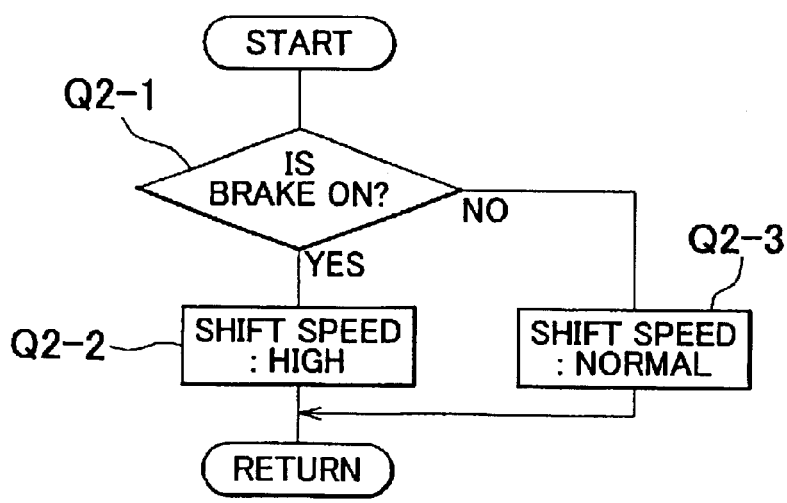
FIG. 14 is a flowchart representing a routine executed by a unit for changing downshifting speed as shown in FIG. 4.

The embodiment corresponds to the flowchart in FIG. 14.

In the aforementioned embodiment, the shifting speed, that is, oil pressure is selected upon ON/OFF operation of the foot brake. Alternatively, however, it can be selected on the basis of the information of the brake fluid pressure supplied from the ABS 84, for example. Further the shifting speed may be selected on the basis of the braking fluid pressure continuously or in a plurality of stages.

Figure 16:
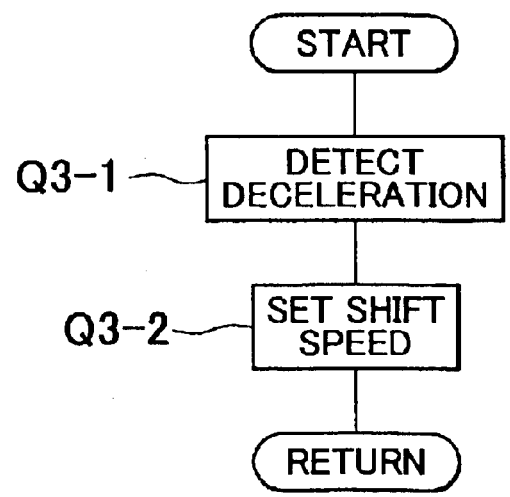
FIG. 16 is a flowchart representing another routine executed by the unit for changing downshifting speed as shown in FIG. 4.

Referring to a flowchart of FIG. 16, in step Q3-1, the deceleration of the vehicle is detected on the basis of the change in the vehicle speed V. The process then proceeds to step Q3-2 where the shifting speed (oil pressure for engagement) is changed in accordance with the detected deceleration continuously or in a plurality of stages. Even in case of deceleration of the vehicle owing to running on the uphill, the downshifting speed is increased to extend the time for fuel cut operation.

The unit 116 for changing shifting condition serves to change the condition of shifting performed by the automatic transmission 16 such that the coast downshifting is executed while continuing the fuel cut operation even when the F/C release engine speed $NE_{FC}$ is changed by the unit 112 for changing F/C release engine speed. The unit 116 executes a routine for processing signals in accordance with a flowchart shown in FIG. 17. Referring to the flowchart in FIG. 17, in step Q4-1, it is determined whether the F/C release engine speed $NE_{FC}$ has been increased to a high-speed value upon ON operation of the air conditioning device 86 by the unit 102 for changing F/C release engine speed on the basis of a flag and the like. If YES is obtained in step Q4-1, that is, the F/C release engine speed $NE_{FC}$ has been increased to a high-speed value, the process proceeds to step Q4-2 where the shifting condition is changed to the high-speed side. If NO is obtained in step Q4-1, that is, the F/C release engine speed $NE_{FC}$ has a low-speed value, the process proceeds to step Q4-3 where the shifting condition is returned to the normal value. The shifting condition includes not only the vehicle speed at coasting down set to $V_{DN}1$, but also those in the state other than coasting (shift map shown in FIG. 7). Referring to FIG. 13, the vehicle speed V4 may be set to the $V_{DN}1$, and the upshifting line from 5th to 6th speed and the downshifting line from 6th to 5th speed are moved as shown by the chain lines in FIG. 13 so as to interpose the vehicle speed $V_{DN}1$ therebetween. The vehicle speed V4 is close to the lower limit value within the fuel cut range of the 6th speed derived from the F/C release engine speed $NE_{FC}$ and the gear ratio of the 6th speed during ON state of the air conditioning device 86. The aforementioned condition makes it possible to perform downshifting while continuing the fuel cut operation. Meanwhile, the vehicle speed V2 is close to the lower limit value within the fuel cut range of the 6th speed derived from the F/C release engine speed $NE_{FC}$ and the gear ratio of the 6th speed during OFF state of the air conditioning device 86. In the case where the F/C release engine speed $NE_{FC}$ is changed continuously or in a plurality of stages, it is preferable to change the aforementioned shifting condition continuously or in a plurality of stages accordingly.

When the F/C release engine speed $NE_{FC}$ is changed upon ON/OFF operation of the air conditioning device 86, the vehicle speed $V_{DN}1$ or the ordinary shift map other than coasting is changed in accordance with the change in the F/C release engine speed $NE_{FC}$ such that the fuel cut operation is continuously performed, and the fuel efficiency is improved. Since the vehicle speed $V_{DN}1$ is changed as the change in the F/C release engine speed $NE_{FC}$, it can be set to the value as small as possible. The resultant change in the engine speed upon downshifting, and further the change in the engine braking force can be decreased to reduce the shift shock.

Figure 17:
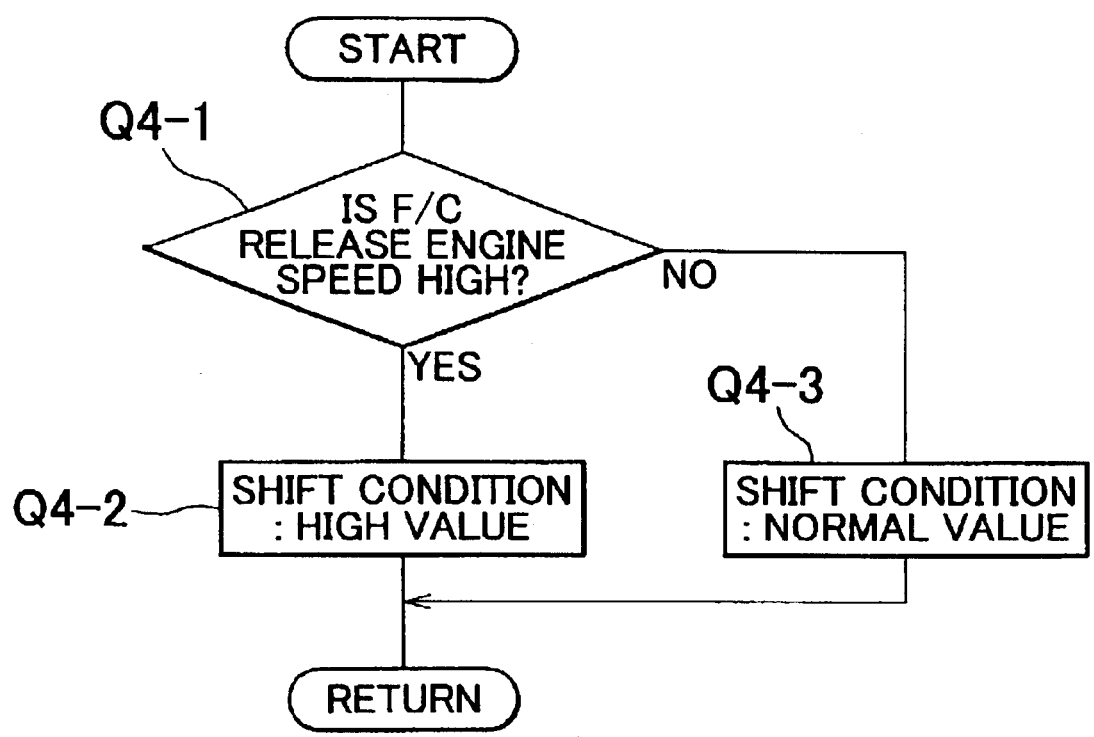
FIG. 17 is a flowchart representing a routine executed by a unit for changing shifting condition as shown in FIG. 4.

The aforementioned embodiment corresponds to the flowchart of FIG. 17.

Figure 18:
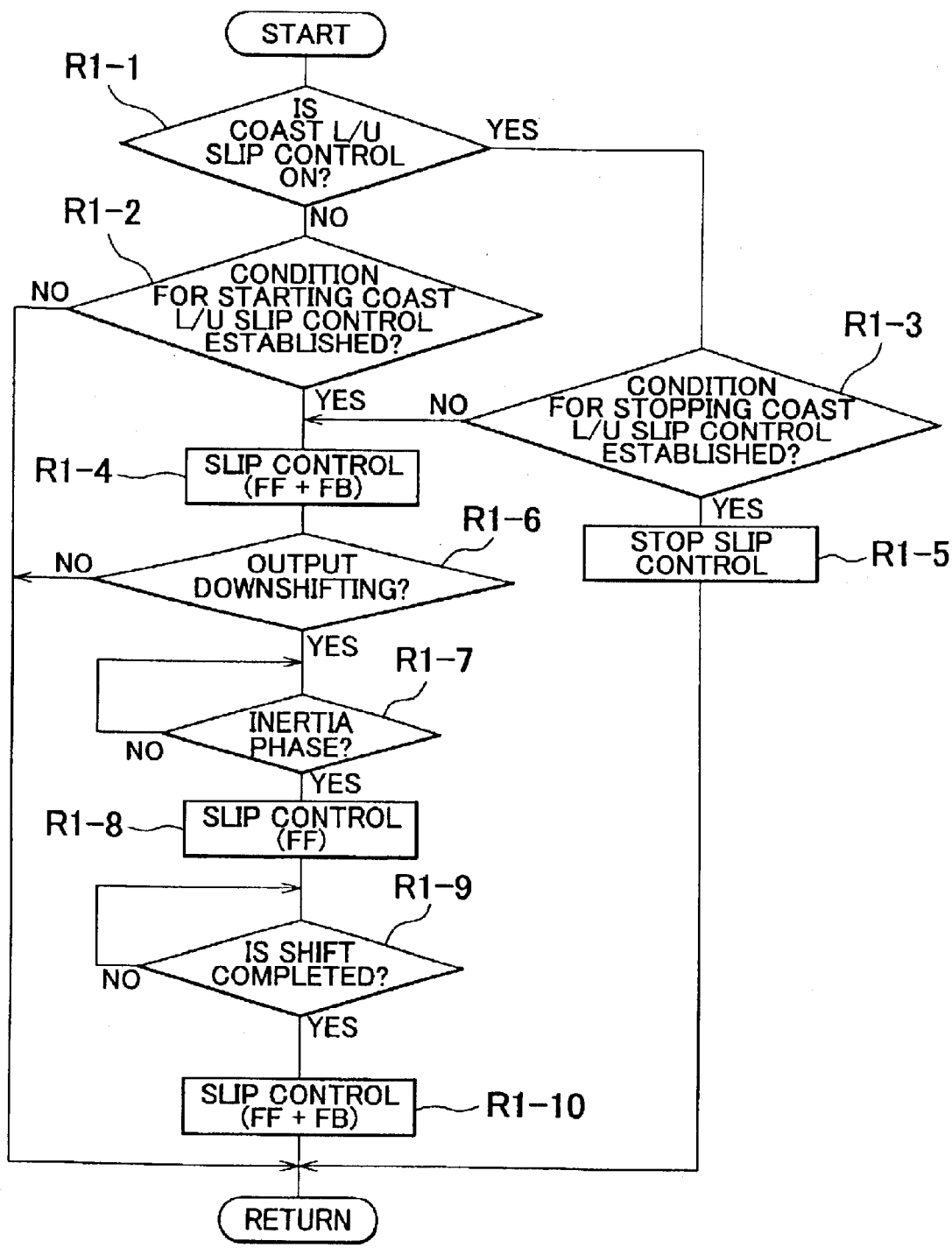
FIG. 18 is a flowchart representing a routine executed by a coast L/U slip control section as shown in FIG. 4.

The coast L/U slip control section 120 includes a slip control unit 122 which executes a routine for processing signals in accordance with a flowchart shown in FIG. 18. Referring to the flowchart in FIG. 18, steps R1-6 to R1-8 are executed by the slip control unit 122. FIG. 19 shows an exemplary timing chart indicating each change in the duty ratio $D_{SLU}$, engine speeds Nout, NT, NE, and the output torque derived from the slip control in accordance with the flowchart in FIG. 18 upon coasting downshifting from 5th to 4th speed. The duty ratio $D_{SLU}$ corresponds to the differential pressure ΔP, and further the engagement torque of the lock-up clutch 26. The output torque corresponds to the engine braking force. As the timing chart in FIG. 19 shows, the engine braking force is increased as the output torque is increased to the side (–).

Referring to the flowchart in FIG. 18, in step R1-1, it is determined whether the coast L/U slip control is executed. If NO is obtained in step R1-1, that is, the slip control is not executed, the process proceeds to step R1-2 where it is determined whether the condition for starting the slip control is met. If YES is obtained in step R1-1, that is, the slip control is executed, the process proceeds to step R1-3 where it is determined whether the condition for stopping the slip control is met. The condition for starting the slip control is determined as being met when (1) the throttle valve opening $θ_{TH}$ is substantially zero and the vehicle is coasting forward, (2) the vehicle speed V is equal to or higher than the predetermined value, and (3) the AT oil temperature $T_{OIL}$ is within a predetermined range where execution of slip control is allowed. If the aforementioned conditions are all met, the process proceeds to step R1-4 where the feed-forward (FF) and feedback (FB) control are executed with respect to the duty ratio $D_{SLU}$ of the exciting current applied to the linear solenoid valve SLU relative to the engagement torque of the lock-up clutch 26 such that the actual slip amount (NE–NT) becomes a predetermined target slip amount SLP (for example, –50 rpm).

The condition for stopping the slip control may be determined as being met when (1) the condition for starting the slip control as determined in step R102 is not established, that is, the accelerator pedal 50 is depressed to increase the accelerator operating amount Acc from the value which is substantially zero, the vehicle speed V becomes lower than the predetermined value, and the AT oil temperature $T_{OIL}$ deviates from the predetermined range. Alternatively a predetermined hysteresis may be used. That is, the slip control may be started if the accelerator OFF state where the accelerator pedal operating amount Acc is substantially zero continues for a predetermined time period or more. The reference vehicle speed used as the condition for stopping the slip control may be decreased by a predetermined amount or rate than that used as the condition for starting the slip control. If NO is obtained in step R1-3, that is, all conditions for stopping the slip control are not met, the process proceeds to step R1-4 where the slip control is continued. Meanwhile if YES is obtained in step R1-3, that is, at least one of the conditions is met, the process proceeds to step R1-5 where the coast L/U slip control is stopped.

In step R1-6, it is determined whether the downshifting is output from the coast downshifting unit 114. If YES is obtained in step R1-6, that is, the downshifting is output, the process proceeds to step R1-7. In step R1-7, it is determined whether the inertia phase starts in the vehicle, that is, the engagement torque of the clutch C at the low-speed gear stage or the brake B (C4 upon downshifting from 5th to 4th speed) is generated by the downshifting output to start increasing the turbine rotational speed NT on the basis of the ratio of the turbine rotational speed NT to the rotational speed Nout of the output shaft. If YES is obtained in step R1-6, that is, the inertia phase starts, the process proceeds to step R1-8 where the feedback control is stopped such that the duty ratio $D_{SLU}$ is controlled only by the feed-forward control. The feed-forward value used in the feed-forward control may be set to the duty ratio $D_{SLU}$ obtained when the determination in step R1-7 becomes YES, the predetermined value that is smaller than the duty ratio $D_{SLU}$ by a predetermined value or rate, or a predetermined set value. Such value may be learned and corrected in case of necessity. Referring to FIG. 19, at a time t1 the downshifting from 5th to 4th speed is output and the determination in step R1-6 becomes YES. Each solid line of the timing chart relates to the embodiment of the invention, and each chain line of the timing chart relates to a general technology for selecting the feed-forward control only at output of downshifting.

Referring to the flowchart of FIG. 18, in step R1-9, it is determined whether the downshifting has been completed. That is, completion of the downshifting is determined when the ratio of the turbine rotational speed NT to the rotational speed of output shaft Nout (NT/Nout) substantially accords with the gear ratio of the gear stage after downshifting. If YES is obtained in step R1-9, that is, the downshifting has been completed, the process proceeds to step R1-10 where the feedback control is resumed to control the duty ratio $D_{SLU}$ such that both the feed-forward and feedback controls are executed to match the actual slip amount (NE–NT) at the predetermined target slip amount SLP (–50 rpm). At a timing t3 in the timing chart of FIG. 19, the downshifting is completed to resume the feedback control.

Upon downshifting performed by the coast downshifting unit 114, the duty ratio $D_{SLU}$ is feedback controlled such that the slip amount of the lock-up clutch 26 becomes the predetermined target value SLP until the inertia phase starts. Unlike the conventional technology as shown by the chain line of the timing chart in FIG. 19, in which the actual slip amount (NE–NT) becomes so large that the engine speed NE is below the F/C release engine speed $NE_{FC}$, the embodiment of the invention avoids deterioration in the fuel efficiency owing to resumption of the fuel supply or sharp change in the output torque. This makes it possible to prevent large decrease in the engine speed NE owing to excessive increase in the slip amount (NE−NT). Therefore, it is possible to set the coast down vehicle speed $V_{DN}1$ to the value as low as possible, reducing the shock by decreasing the change in the engine speed, and further the change in the engine braking force.

The embodiment prevents expansion of the variance of the actual slip amount (NE−NT) from the target slip amount SLP until the start of change in the turbine rotational speed NT, that is, start of the inertia phase upon downshifting. As the feedback control can be continued until the start of the inertia phase and stopped thereafter, decrease in the engine speed owing to stop of the feedback control may be restrained. This makes it possible to reduce variance of the actual slip amount (NE−NT) to the target value SLP as the turbine rotational speed NT changes upon downshifting, avoiding the shift shock caused by the sharp change in the engine speed NE, and further the engine braking force caused by the feedback control.

The embodiment corresponds to the flowchart shown in FIG. 18.

Figure 20:
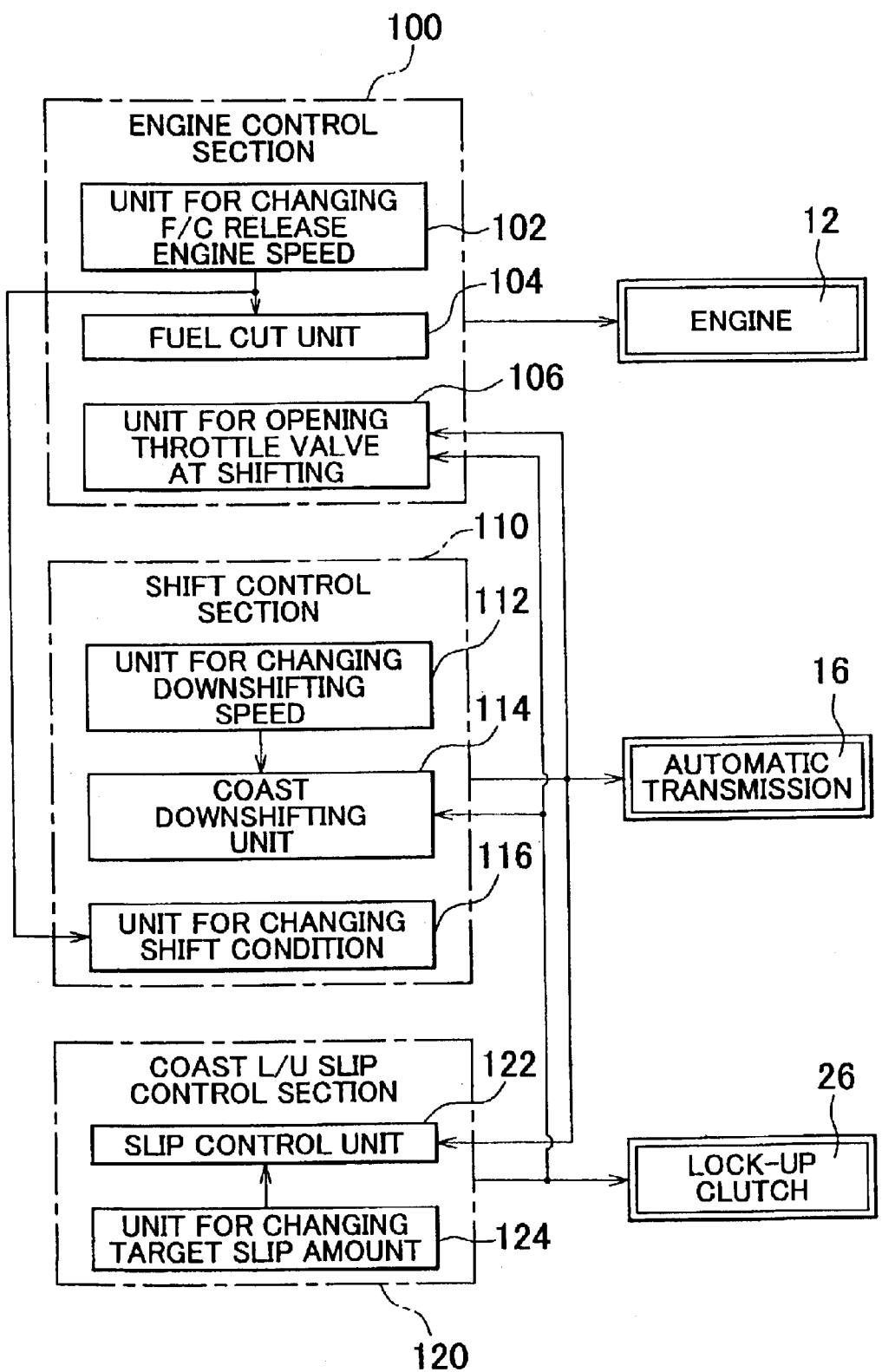
FIG. 20 is a block diagram corresponding to FIG. 4 and representing essential portions in which the coast L/U slip control section includes a slip control unit.
Figure 22:
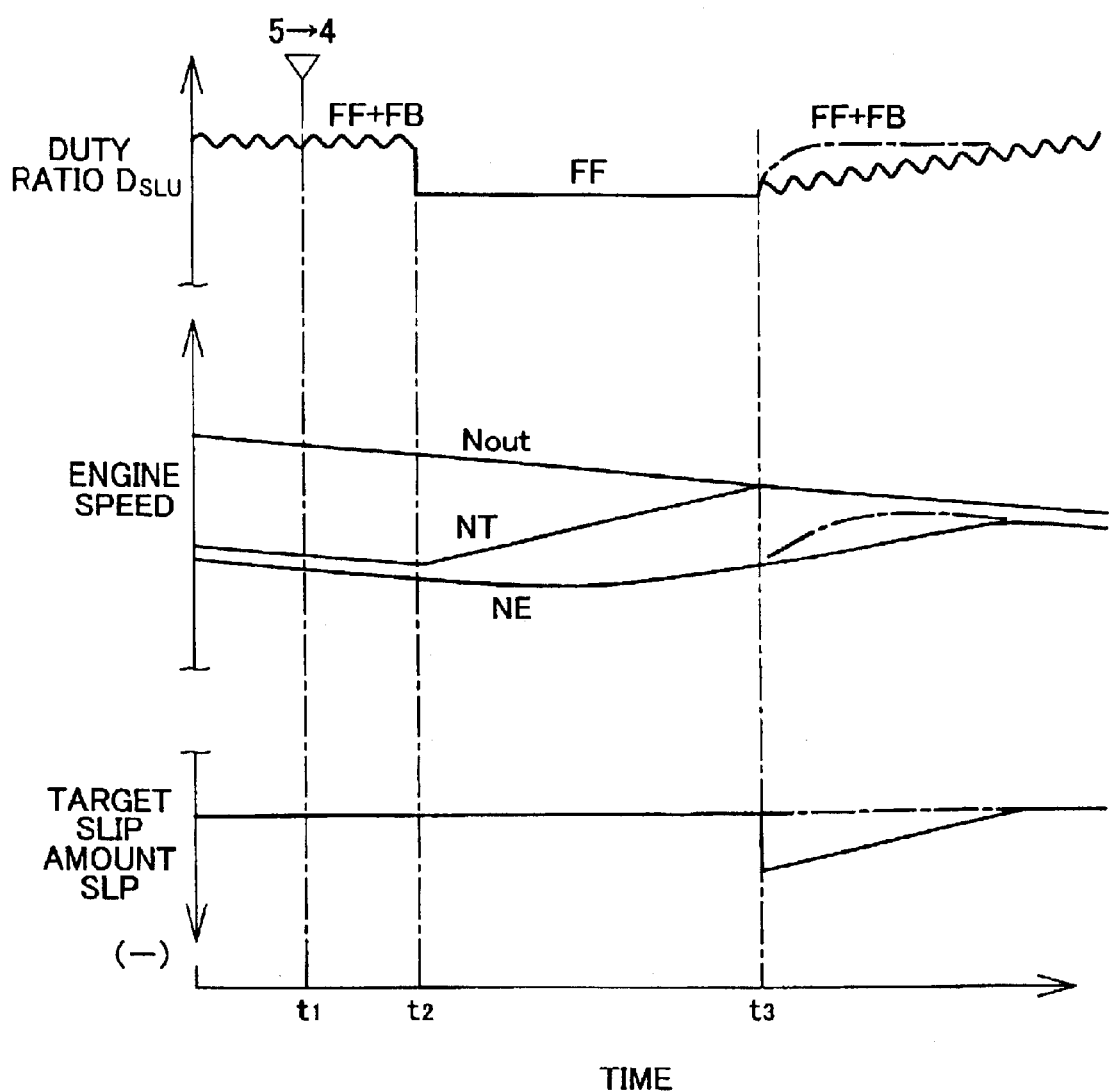
FIG. 22 is a time chart representing each change in the engine speed caused by the slip control in accordance with the flowchart of FIG. 21 at downshifting in the coast state.

In the embodiment, the feedback control is resumed using the target slip amount SLP immediately after completion of shifting. If the deviation between the actual and the target slip amounts, that is, NE−NT and SLP is large, as the chain line of FIG. 22 shows, the engine speed NE and the engine braking force may be changed upon resumption of the feedback control so sharply that shock occurs. A unit 124 for changing the target slip amount may be provided as shown in the block diagram of FIG. 20 so as to change the target slip amount SLP upon resumption of the feedback control after downshifting. This makes it possible to lower the performance ability of the feedback control with respect to the slip amount on a temporary basis.

Figure 21:
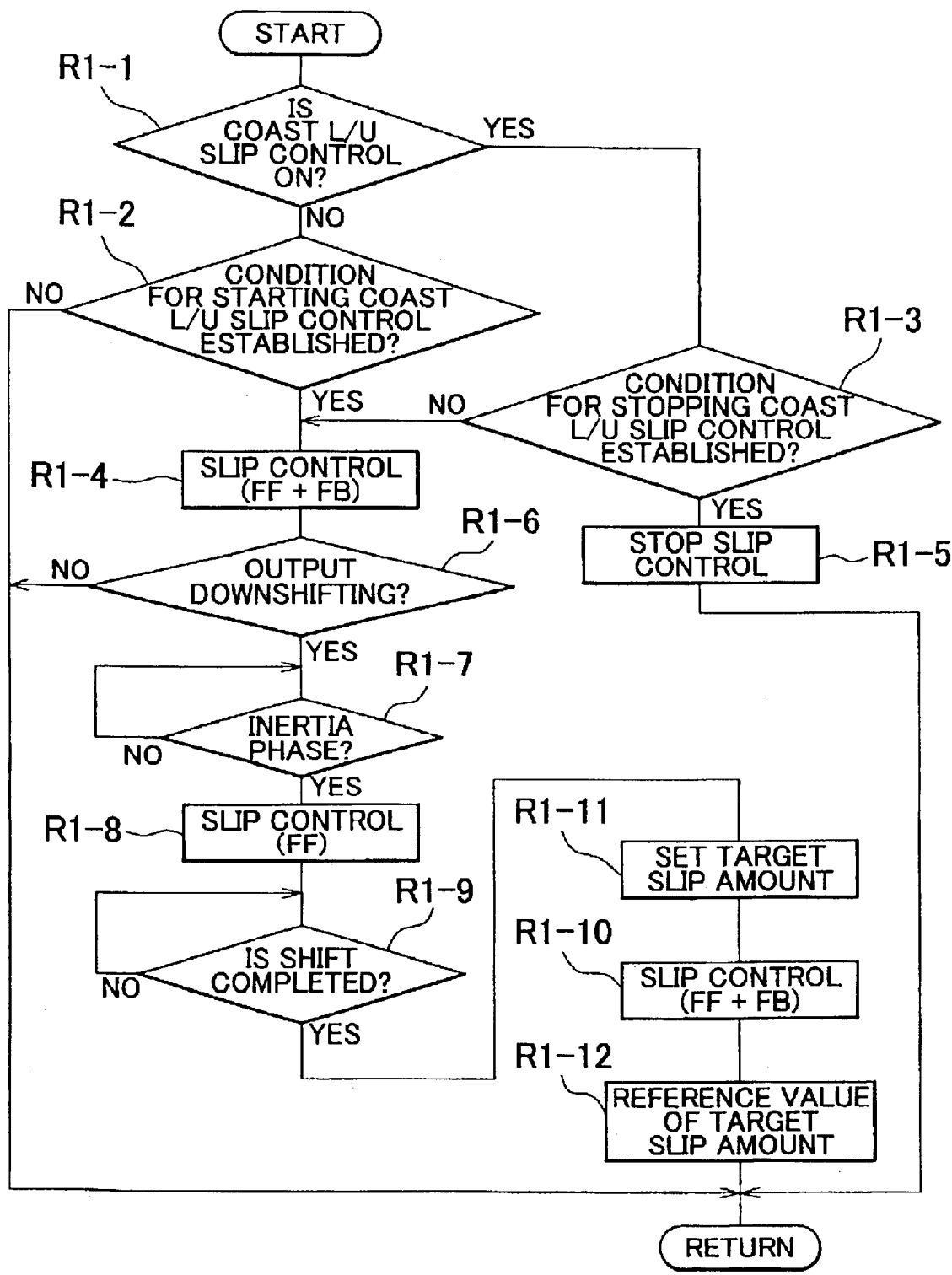
FIG. 21 is a flowchart representing a routine executed by the coast L/U slip control section as shown in FIG. 20.

Referring to a flowchart of FIG. 21, if YES is obtained in step R1-9 after completion of downshifting, the process proceeds to step R1-1 where the target slip amount SLP is set to the value corresponding to the actual slip amount (NE−NT), or the value smaller than the actual slip amount by a predetermined amount or a predetermined rate (close to zero). Then in step R1-10, the feedback control is resumed using the obtained target slip amount SLP. In step R1-12, the target slip amount SLP is gradually returned to the previous reference value (for example, −50 rpm) such that the actual slip amount (NE−NT) gently approaches the reference value. The unit 124 executes the process in steps R1-1 and R1-12. The solid line shown in FIG. 22 represents an exemplary timing chart indicating each change in the duty ratio $D_{SLU}$, engine speeds Nout, NT, and NE, and the target slip amount SLP in the embodiment.

In the embodiment, upon resumption of the feedback control after downshifting, the target slip amount SLP is temporarily increased in accordance with the actual slip amount by the unit 124, and then is gradually returned to the previous target slip amount (reference value). This makes it possible to cause the slip amount (NE−NT) that has been increased as the change in the turbine rotational speed NT at downshifting to gently approach the previous target slip amount (reference value). As a result, the engine speed NE and the engine braking force are gradually changed, avoiding the shift shock.

The embodiment corresponds to the flowchart shown in FIG. 21.

While the preferred embodiments of the invention have been described using specific terms, such description is for illustrative purposes only, and it is to be understood that changes and variations may be made without departing from the spirit or scope of the appended claims.

What is claimed is:

1. A vehicle drive control apparatus, comprising:
   an engine that generates power through combustion of fuel;
   an automatic transmission that transmits a reverse input from a driving wheel to the engine and automatically performs a gear shifting among a plurality of forward gear stages each having a different gear ratio;
   a fluid power transmission device interposed between the automatic transmission and the engine for transmitting power through fluid, the fluid power transmission device having a lock-up clutch; and
   a controller that:
      executes a fuel cut control for stopping supply of the fuel to the engine upon establishment of a fuel cut condition including that a vehicle is in a coasting state where a throttle valve of the engine is fully closed, and an engine speed is equal to or higher than a predetermined value;
      executes a control for engaging the lock-up clutch upon establishment of a lock-up clutch engagement condition including that the vehicle is in the coasting state; and
      executes a control of the automatic transmission for downshifting at a coast down vehicle speed that changes in accordance with a state of the lock-up clutch under the control for engaging the lock-up clutch.

2. The vehicle drive control apparatus according to claim 1, wherein the controller sets the coast down vehicle speed at which the lock-up clutch is engaged to be higher than the coast down vehicle speed at which the lock-up clutch is disengaged.

3. The vehicle drive control apparatus according to claim 1, wherein the controller sets the coast down vehicle speed at which the lock-up clutch is disengaged is higher than the coast down vehicle speed at which the lock-up clutch is engaged.

4. A vehicle drive control apparatus, comprising:
   an engine that generates power through combustion of fuel;
   an automatic transmission that transmits a reverse input from a driving wheel to the engine and automatically performs a gear shifting among a plurality of forward gear stages each having a different gear ratio; and
   a controller that:
      executes a fuel cut control for stopping supply of the fuel to the engine upon establishment of a fuel cut condition including that a vehicle is in a coasting state where a throttle valve of the engine is fully closed, and an engine speed is equal to or higher than a predetermined fuel cut release engine speed; and
      changes a coast down vehicle speed and upshifting vehicle speed in accordance with a change in the fuel cut release engine speed so as to continue the fuel cut control irrespective of the change in the fuel cut release engine speed.

5. A vehicle drive control apparatus, comprising:
   an engine that generates power through combustion of fuel;
   an automatic transmission that transmits a reverse input from a driving wheel to the engine and automatically performs a gear shifting among a plurality of forward gear stages each having a different gear ratio; and a controller that:
  executes a fuel cut control for stopping supply of the fuel to the engine upon establishment of a fuel cut condition including that a vehicle is in a coasting state where a throttle valve of the engine is fully closed, and an engine speed is equal to or higher than a predetermined value;
  executes a control of the automatic transmission for downshifting at a predetermined coast down vehicle speed so as to continue the fuel cut control in the coasting state; and
  executes a control of changing a downshifting speed such that the downshifting speed increases as an increase in a deceleration of the vehicle.

6. A vehicle drive control apparatus, comprising:
an engine that generates power through combustion of fuel;
an automatic transmission that transmits a reverse input from a driving wheel to the engine and automatically performs a gear shifting among a plurality of forward gear stages each having a different gear ratio;
a fluid power transmission device interposed between the automatic transmission and the engine for transmitting power through fluid, the fluid power transmission device having a lock-up clutch; and
a controller that:
  executes a fuel cut control for stopping supply of the fuel to the engine upon establishment of a fuel cut condition including that a vehicle is in a coasting state where a throttle valve of the engine is fully closed, and an engine speed is equal to or higher than a predetermined value;
  executes a control for engaging the lock-up clutch upon establishment of a lock-up clutch engagement condition including that the vehicle is in the coasting state;
  executes a control of the automatic transmission for downshifting at a predetermined coast down vehicle speed so as to continue the fuel cut control in the coasting state; and
  executes a feedback control of an engagement torque of the lock-up clutch such that a slip amount of the lock-up clutch reaches a target slip amount upon execution of the control of the automatic transmission for downshifting.

7. The vehicle drive control apparatus according to claim 6, wherein the controller continues the feedback control of the engagement torque of the lock-up clutch at least until a timing when a rotational speed of an input shaft of the automatic transmission starts changing upon the downshifting, and stops thereafter.

8. A vehicle drive control apparatus, comprising:
an engine that generates power through combustion of fuel;
an automatic transmission that transmits a reverse input from a driving wheel to the engine and automatically performs a gear shifting among a plurality of forward gear stages each having a different gear ratio;
a fluid power transmission device interposed between the automatic transmission and the engine for transmitting power through fluid, the fluid power transmission device having a lock-up clutch; and
a controller that:
  executes a fuel cut control for stopping supply of the fuel to the engine upon establishment of a fuel cut condition including that a vehicle is in a coasting state where a throttle valve of the engine is fully closed, and an engine speed is equal to or higher than a predetermined value;
  executes a feedback control of an engagement torque of the lock-up clutch such that a slip amount of the lock-up clutch reaches a target slip amount upon establishment of a lock-up engagement condition including that the vehicle is in the coasting state; and
  executes a control of the automatic transmission for downshifting at a predetermined coast down vehicle speed so as to continue the fuel cut control in the coasting state; wherein
  the feedback control of the engagement torque of the lock-up clutch is temporarily stopped upon downshifting, and a performance ability of the feedback control of the slip amount is temporarily lowered upon resumption of the feedback control of the engagement torque of the lock-up clutch after the downshifting.

9. The vehicle drive control apparatus according to claim 8, wherein the controller temporarily increases the target slip amount to a temporal target slip amount in accordance with an actual slip amount upon resumption of the feedback control after the downshifting, and gradually returns the temporal target slip amount to the target slip amount that has been previously set.

10. A vehicle drive control apparatus, comprising:
an engine that generates power through combustion of fuel;
an automatic transmission that transmits a reverse input from a driving wheel to the engine and automatically performs a gear shifting among a plurality of forward gear stages each having a different gear ratio; and
a controller that:
  executes a fuel cut control for stopping supply of the fuel to the engine upon establishment of a fuel cut condition including that a vehicle is in a coasting state where a throttle valve of the engine is fully closed, and an engine speed is equal to or higher than a predetermined value;
  executes a control of the automatic transmission for downshifting at a predetermined coast down vehicle speed so as to continue the fuel cut control in the coasting state; and
  temporarily expands an air passage in an intake side of the engine while continuing execution of the fuel cut control during the downshifting.

11. A control method of a vehicle drive control apparatus including an engine that generates power through combustion of fuel, an automatic transmission that transmits a reverse input from a driving wheel to the engine and automatically performs a gear shifting among a plurality of forward gear stages each having a different gear ratio, and a fluid power transmission device having a lock-up clutch and interposed between the automatic transmission and the engine for transmitting power through fluid, the control method comprising:
  executing a fuel cut control for stopping supply of the fuel to the engine upon establishment of a fuel cut condition including that a vehicle is in a coasting state where a throttle valve of the engine is fully closed, and an engine speed is equal to or higher than a predetermined value;
  executing a control for engaging the lock-up clutch upon establishment of a lock-up clutch engagement condition including that the vehicle is in the coasting state; and
  executing a control of the automatic transmission for downshifting at a coast down vehicle speed that changes in accordance with a state of the lock-up clutch under the control for engaging the lock-up clutch.

12. The control method according to claim 11, wherein the coast down vehicle speed at which the lock-up clutch is engaged is set to be higher than the coast down vehicle speed at which the lock-up clutch is disengaged.

13. The control method according to claim 11, wherein the coast down vehicle speed at which the lock-up clutch is disengaged is set to be higher than the coast down vehicle speed at which the lock-up clutch is engaged.

14. A control method of a vehicle drive control apparatus including an engine that generates power through combustion of fuel, and an automatic transmission that transmits a reverse input from a driving wheel to the engine and automatically performs a gear shifting among a plurality of forward gear stages each having a different gear ratio, the control method comprising:

executing a fuel cut control for stopping supply of the fuel to the engine upon establishment of a fuel cut condition including that a vehicle is in a coasting state where a throttle valve of the engine is fully closed, and an engine speed is equal to or higher than a predetermined fuel cut release engine speed; and changing a coast down vehicle speed and upshifting vehicle speed in accordance with a change in the fuel cut release engine speed so as to continue the fuel cut control irrespective of the change in the fuel cut release engine speed.

15. A control method of a vehicle drive control apparatus including an engine that generates power through combustion of fuel, and an automatic transmission that transmits a reverse input from a driving wheel to the engine and automatically performs a gear shifting among a plurality of forward gear stages each having a different gear ratio, the control method comprising:

executing a fuel cut control for stopping supply of the fuel to the engine upon establishment of a fuel cut condition including that a vehicle is in a coasting state where a throttle valve of the engine is fully closed, and an engine speed is equal to or higher than a predetermined value;

executing a control of the automatic transmission for downshifting at a predetermined coast down vehicle speed so as to continue the fuel cut control in the coasting state; and executing a control of changing a downshifting speed such that the downshifting speed increases as an increase in a deceleration of the vehicle.

16. A control method of a vehicle drive control apparatus including an engine that generates power through combustion of fuel, an automatic transmission that transmits a reverse input from a driving wheel to the engine and automatically performs a gear shifting among a plurality of forward gear stages each having a different gear ratio, and a fluid power transmission device having a lock-up clutch and interposed between the automatic transmission and the engine for transmitting power through fluid, the control method comprising:

executing a fuel cut control for stopping supply of the fuel to the engine upon establishment of a fuel cut condition including that a vehicle is in a coasting state where a throttle valve of the engine is fully closed, and an engine speed is equal to or higher than a predetermined value;

executing a control for engaging the lock-up clutch upon establishment of a lock-up clutch engagement condition including that the vehicle is in the coasting state;

executing a control of the automatic transmission for downshifting at a predetermined coast down vehicle speed so as to continue the fuel cut control in the coasting state; and executing a feedback control of an engagement torque of the lock-up clutch such that a slip amount of the. lock-up clutch reaches a target slip amount upon execution of the control of the automatic transmission for downshifting.

17. The control method according to claim 16, wherein the feedback control of the engagement torque of the lock-up clutch is continued at least until a timing when a rotational speed of an input shaft of the automatic transmission starts changing upon the downshifting, and stopped thereafter.

18. A control method of a vehicle drive control apparatus including an engine that generates power through combustion of fuel, an automatic transmission that transmits a reverse input from a driving wheel to the engine and automatically performs a gear shifting among a plurality of forward gear stages each having a different gear ratio, and a fluid power transmission device interposed between the automatic transmission and the engine for transmitting power through fluid, the fluid power transmission device having a lock-up clutch, the control method comprising:

executing a fuel cut control for stopping supply of the fuel to the engine upon establishment of a fuel cut condition including that a vehicle is in a coasting state where a throttle valve of the engine is fully closed, and an engine speed is equal to or higher than a predetermined value;

executing a feedback control of an engagement torque of the lock-up clutch such that a slip amount of the lock-up clutch reaches a target slip amount upon establishment of a lock-up engagement condition including that the vehicle is in the coasting state; and executing a control of the automatic transmission for downshifting at a predetermined coast down vehicle speed so as to continue the fuel cut control in the coasting state; wherein the feedback control of the engagement torque of the lock-up clutch is temporarily stopped upon downshifting, and a performance ability of the feedback control of the slip amount is temporarily lowered upon resumption of the feedback control of the engagement torque of the lock-up clutch after the downshifting.

19. The control method according to claim 18, wherein the target slip amount is temporarily increased to a temporal target slip amount in accordance with an actual slip amount upon resumption of the feedback control after the downshifting, and the temporal target slip amount is gradually returned to the target slip amount that has been previously set.

20. A control method of a vehicle drive control apparatus including an engine that generates power through combustion of fuel, and an automatic transmission that transmits a reverse input from a driving wheel to the engine and automatically performs a gear shifting among a plurality of forward gear stages each having a different gear ratio, the control method comprising:

executing a fuel cut control for stopping supply of the fuel to the engine upon establishment of a fuel cut condition including that a vehicle is in a coasting state where a throttle valve of the engine is fully closed, and an engine speed is equal to or higher than a predetermined value;

executing a control of the automatic transmission for downshifting at a predetermined coast down vehicle speed so as to continue the fuel cut control in the coasting state; and temporarily expanding an air passage in an intake side of the engine while continuing execution of the fuel cut control during the downshifting.

* * * * *